(12) United States Patent
Yabusaki et al.

(10) Patent No.: US 9,203,702 B2
(45) Date of Patent: Dec. 1, 2015

(54) PATH CALCULATION METHOD

(71) Applicant: HITACHI, LTD., Tokyo (JP)

(72) Inventors: Hitoshi Yabusaki, Tokyo (JP); Daisuke Matsubara, Yokohama (JP); Kota Kawahara, Yokohama (JP); Kenji Kataoka, Yokohama (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 13/717,092

(22) Filed: Dec. 17, 2012

(65) Prior Publication Data

US 2013/0242804 A1   Sep. 19, 2013

(30) Foreign Application Priority Data

Mar. 13, 2012   (JP) ................... 2012-055254

(51) Int. Cl.
*H04L 12/24* (2006.01)
*H04L 12/701* (2013.01)
*H04L 12/715* (2013.01)
*H04L 12/717* (2013.01)

(52) U.S. Cl.
CPC ............ *H04L 41/0893* (2013.01); *H04L 45/00* (2013.01); *H04L 45/04* (2013.01); *H04L 45/42* (2013.01); *H04L 41/12* (2013.01)

(58) Field of Classification Search
CPC ......... H04L 12/24; H04L 45/04; H04L 45/00; H04L 45/028; H03K 19/17736; H03K 19/17704
USPC .................. 370/255, 254, 392, 259, 389, 238
See application file for complete search history.

(56) References Cited

U.S. PATENT DOCUMENTS

| 7,545,829 | B2* | 6/2009 | Shimazaki et al. ........... 370/468 |
| 2004/0184441 | A1* | 9/2004 | Wu et al. ....................... 370/351 |
| 2007/0058607 | A1* | 3/2007 | Mack-Crane et al. ........ 370/351 |
| 2008/0002664 | A1 | 1/2008 | Li et al. |
| 2010/0051215 | A1 | 3/2010 | Rhoten |

FOREIGN PATENT DOCUMENTS

| JP | 2006-121249 A | 5/2006 |
| JP | 2007-019852 A | 1/2007 |
| JP | 2008-042670 A | 2/2008 |
| WO | 2011/070830 A1 | 6/2011 |

* cited by examiner

*Primary Examiner* — Jamal Javaid

(57) ABSTRACT

When a path which is a network communication path is calculated, the amount of path calculation is reduced while satisfying the requirement of the path. The network is logically divided into a plurality of calculation domains, and the divided calculation domains are hierarchically managed, and the path attribute of a path within the calculation domain of a lower hierarchical layer is held as a link attribute of an abstract link of a higher hierarchical layer.

8 Claims, 17 Drawing Sheets

FIG.4

ABSTRACT LINK INFORMATION 3200

| CALCULATION DOMAIN ID | ABSTRACT LINK ID | UP-SIDE NODE ID | DOWN-SIDE NODE ID | LINK ATTRIBUTE | COST | PATH ID WITHIN A LINK | NUMBER OF HOPS WITHIN A LINK | REDUNDANT PATH | TRANSMISSION DELAY | BANDWIDTH | RESIDUAL BANDWIDTH | ACCOMMODA-TION RATE |
|---|---|---|---|---|---|---|---|---|---|---|---|---|
| 142-1 | 680-1 | 650-1 | 650-2 | 1 | 11 | 1 | 1 | 2 | 24ms | 4Gbps | 1.6Gbps | 40% |
| | | | | 2 | 12 | 2 | 3 | 1 | 28ms | 3Gbps | 2.4Gbps | 80% |
| | 680-2 | ... | ... | ... | ... | ... | ... | ... | ... | ... | ... | ... |

FIG.5

NODE/DOMAIN MAPPING INFORMATION 3100

| HIGHER CALCULATION DOMAIN ID | CALCULATION DOMAIN ID | NODE ID | EDGE FLAG | LOWER CALCULATION DOMAIN ID | NODE ID OF HIGHER CALCULATION DOMAIN | NODE ID OF LOWER CALCULATION DOMAIN |
|---|---|---|---|---|---|---|
| 142-1 | 141-1 | 550-1 | Yes | 140 | 650-1 | 150-1 |
| | | 550-2 | No | 140 | – | 150-2 |
| | | 550-3 | Yes | 140 | 650-3 | 150-3 |
| | | 550-4 | Yes | 140 | 650-4 | 150-4 |
| | 141-2 | 550-5 | Yes | 140 | 650-5 | 150-5 |
| | | 550-6 | No | 140 | – | 150-6 |
| | | ... | ... | ... | ... | ... |

FIG.6

MANAGEMENT DOMAIN INFORMATION 3700

| MANAGEMENT DOMAIN ID | NODE ID |
|---|---|
| 1 | 550-1 |
| | 550-2 |
| | 550-3 |
| 2 | 550-4 |
| ... | ... |

FIG.7

NODE INFORMATION 3400

| CALCULATION DOMAIN ID | NODE ID | INPUT I/F | OUTPUT I/F | TRANSFER DELAY | BANDWIDTH | USAGE BANDWIDTH | ACCOMMODATION RATE |
|---|---|---|---|---|---|---|---|
| 142-1 | 650-1 | IF1 | IF2 | 10ms | 4Gbps | 1.6Gbps | 40% |
| | | | IF3 | 10ms | 3Gbps | 2.4Gbps | 80% |
| | | | IF4 | 10ms | 3Gbps | 0.9Gbps | 30% |
| | | IF2 | IF1 | 12ms | | | |
| | | | IF3 | | | | |
| | ⋮ | ⋮ | ⋮ | ⋮ | ⋮ | ⋮ | ⋮ |
| 142-2 | 650-2 | | | | | | |
| ⋮ | ⋮ | | | | | | |

FIG.8

NODE CONNECTION INFORMATION 3500

| CALCULA-TION DOMAIN ID | NODE ID | EDGE FLAG | PORT ID | CONNEC-TION LINK ID | ADJACENT LINK ID | PORT ID OF CONNEC-TION NODE |
|---|---|---|---|---|---|---|
| 142-1 | 650-1 | YES | 1 | 680-1 | 650-2 | 1 |
|  |  |  | 2 | 680-2 | 650-3 | 2 |
|  | 650-3 | NO | 1 | 680-1 | 650-1 | 1 |
| ⋮ | ⋮ |  | ⋮ | ⋮ | ⋮ | ⋮ |

FIG.9

CANDIDATE PATH INFORMATION 3300

| CALCULATION DOMAIN ID | PATH ID | ABSTRACT LINK ID | LINK ATTRIBUTE | COST | DELAY | REDUNDANT PATH | NUMBER OF HOPS | LOWEST LINE BANDWIDTH | RESIDUAL BANDWIDTH | ACCOMMO-DATION RATE | PASSING-THROUGH NODE ID | PASSING-THROUGH LINK ID |
|---|---|---|---|---|---|---|---|---|---|---|---|---|
| 141-1 | 1 | 680-1 | 1 | 11 | 24ms | 2 | 1 | 4Gbps | 1.6Gbps | 40% | 550-1, 550-3 | 580-1 |
| | 2 | 680-1 | 2 | 12 | 28ms | 1 | 3 | 3Gbps | 2.4Gbps | 80% | 550-1, 550-2, 550-4, 550-3 | 580-2, 580-3, 580-4 |

FIG.10

| PATH REQUEST | 3600 |
|---|---|
| PATH REQUEST ID | 1 |
| SOURCE NODE ID | 150-1 |
| DESTINATION NODE ID | 150-8 |
| SPECIFIED/NON-SPECIFIED NODE ID | 150-4 / - |
| PASSING-THROUGH /NON-PASSING THROUGH NODE ID | 150-7 / - |
| DETAIL-SPECIFIED DOMAIN ID | 141-2 |
| PRIORITY | HIGH |
| DELAY CONSTRAINT | 30ms |
| REQUEST BANDWIDTH | 100Mbps |
| PRESENCE OR ABSENCE OF STANDBY PATH | PRESENT |
| JITTER | 3ms |
| PACKET LOSS RATE | 0.01% |
| STANDBY PATH BAND SECURING METHOD | 1:01 |
| DIRECTIVITY | BI-DIRECTIONAL |
| CANDIDATE PATH | CANDIDATE IS PRESENT |
| SELECTION OF PATH | NO SELECTION |

FIG.11

LINK INFORMATION 3900

| CALCULA-TION DOMAIN ID | LINK ID | UP-SIDE NODE ID | DOWN-SIDE NODE ID | TRANS-MISSION DELAY | LINE BANDWIDTH | RESIDUAL BANDWIDTH | ACCOMMO-DATION RATE |
|---|---|---|---|---|---|---|---|
| 141-1 | 580-1 | 550-1 | 550-2 | 8ms | 4Gbps | 1.6Gbps | 60% |
| | | | 550-3 | 9ms | 3Gbps | 2.4Gbps | 20% |
| | | 550-2 | 550-1 | ⋮ | ⋮ | ⋮ | ⋮ |
| | 580-2 | | 550-4 | ⋮ | ⋮ | ⋮ | ⋮ |
| 141-2 | | | | | | | |

PATH CALCULATION METHOD

INCORPORATION BY REFERENCE

This application claims priority based on Japanese patent application, No. 2012-055254 filed on Mar. 13, 2012, the entire contents of which are incorporated herein by reference.

BACKGROUND

The subject matter disclosed herein relates to a transport control server (TCS), and in particular relates to the transport control server for calculating a communication path.

In recent years, for the purpose of achieving higher reliability and higher quality, a transport control server has been developed for controlling a plurality of network protocols and networks which connect communication paths between communication user points in an end-to-end relationship. Examples of the network protocol include MPLS (Multi-Protocol Label Switching), MPLS-TP (MPLS Transport Profile), PBB-TE (Provider Backbone Bridge Traffic Engineering), OpenFlow, GMPLS (General MPLS), and the like.

These protocols are used, for example, in a wide area network connecting user points and/or data centers, within a data center, and in a virtual network under-study by New Generation. Example of the wide area network include a company private line, L2VPN (Layer2 Virtual Private Line), L3 VPN (Layer3 VPN), and the like. The virtual network is a network, under study by GENI and the like, in which a transmitting device has functions, such as programmability, in order to logically divide a physical network resource and have flexibility.

In the transport control server, path calculation corresponding to scalability and flexibility is the subject. Scalability is the capability to respond to an increase of the number of transmitting devices, an increase of the number of communication paths, and the like. These increases and the like are caused by an increase of communication users, an increase of traffic per capita, network integration, and the like. Flexibility is the capability to reflect various operation policies, such as a request bandwidth, delay restrictions, the presence or absence of a standby path, a method for securing the bandwidth of a standby path, and the bandwidth use efficiency.

In a network divided and managed as a plurality of domains, a plurality of communication paths in each domain are managed as one link (herein, referred to as an abstract link). Then, when a path via a plurality of the domains is set in an end-to-end relationship, the path is calculated based on the information on an abstract link. Herein, this is referred to as hierarchical routing. A logical communication path connecting user points, nodes, and/or the like is referred to as a path.

Hereinafter, a conventional art related to the above-described problem is described.

In US Patent Application Publication No. 2010/051215, in selecting the shortest path by hierarchical distributed routing, the shortest path cost between border routers of a relevant lower subnetwork is acquired by a PCS (Path Computation Server) of a higher layer from a shortest-path list within an area which a PCS of a lower layer manages, and this cost is regarded as a virtual link cost, and based on the acquired virtual link cost between boundary nodes and the link cost between the subnetworks which the PCS of a higher layer manages, the shortest path from the point of origin to the end point is calculated. This enables to select the shortest path between calculation domains of a lower hierarchical layer.

In JP-A-2008-42670, a path calculation domain is determined, and then from a path calculation domain side in which an end-point node is present toward a path calculation domain in which an initial node is present, redundant paths within a domain are sequentially calculated by a path calculation unit in each path solution system. Then, the redundant paths within a domain which each path solution system calculated are connected together to calculate a redundant path between an initial node and an end-point node. This enables to efficiently calculate redundant paths (a working path and a standby path) in a multidomain network.

In JP-A-2007-19852, a path calculation program of each server of a plurality of customer networks selects root candidates within a distributed network, respectively, and then an optimum route is determined in cooperation with the path calculation program by hierarchically combining the root candidates. Thus, a technique can be provided, which, when a VPN service for coupling user networks (i.e., "customer networks") using MPLS is provided, determines a path satisfying user's quality requirements in an end-to-end relationship, including also paths within a customer network, and which also achieves a differentiation in a customer network in accordance with SLA and further determines a backup path for failures.

In US Patent Application Publication No. 2008/0002664, a path calculation element is hierarchized, and thereby in the higher layer and lower layer of the path calculation element, the calculation domain of the path calculation element is mapped and a calculation task is hierarchically divided and the route calculation is performed in a parallel mode, so that the calculation amount which each path calculation element carries out can be reduced.

SUMMARY

Hereinafter, the problems of the conventional arts are described.

In US Patent Application Publication No. 2010/051215, the calculation is carried out with an abstract link caused to have single cost information, however the abstract link does not hold link attributes, such as a delay and a bandwidth usage rate. As a result, neither delay restriction nor residual bandwidth can be selected in an appropriate abstract link, so SLA (Service Level Agreement) might not be guaranteed. Moreover, because an abstract link with a low bandwidth usage rate cannot be selected, traffic may concentrate on a certain abstract link.

Similarly, JP-A-2008-42670, JP-A-2007-19852, and US Patent Application Publication No. 2008/0002664 also have the same drawback as US Patent Application Publication No. 2010/051215 because the link attributes are not held.

As stated above, with the conventional art, the link attributes, such as a delay and a bandwidth usage rate, are not held as an abstract link, so an appropriate abstract link satisfying the requirements, such as delay restrictions and a request bandwidth, and/or the operation policies, such as the effective usage of bandwidth, cannot be selected.

On the other hand, if an abstract link is embodied by increasing the amount of abstract link information, the information on the abstract link per link will increase and also the number of abstract links to hold will increase, resulting in an increase in the amount of path calculation. The disclosed system enables to select an appropriate abstract link without increasing the amount of path calculation as much as possible.

Disclosed herein are: a path calculation method which, with a small amount of path calculation, satisfies the path requirements, such as delay restrictions, a request bandwidth, and the redundancy of paths, and restrictions on the number of hopes, and further enables the selection of an appropriate path; and a path management server and a path management system using this method.

According to a first aspect disclosed herein, there is provided a path calculation method in a hierarchical network comprising; a real network comprising a plurality of nodes and a plurality of links; a first hierarchical layer including one or more calculation domains obtained by logically dividing the real network; a second hierarchical layer including: an abstract node, which is a node selected based on a predetermined criteria from the plurality of nodes, the abstract node including one or more calculation domains each including one or more calculation domains of the first hierarchical layer; and an abstract link coupling the abstract nodes, the method comprising the steps of: associating, as candidate paths, one or more paths in the first hierarchical layer, end points of which are the plurality of nodes of the first hierarchical layer corresponding to the abstract node, with one abstract link in a calculation domain of the second hierarchical layer; managing some or all of path attributes of the candidate paths as a link attribute of the associated abstract link of the second hierarchical layer; and in setting a path coupling two of the plurality of nodes and in setting a path coupling two of the abstract nodes in the second hierarchical layer as a combination of the abstract links, calculating the path based on the link attribute managed by being associated with the abstract link.

This enables to select, with a small amount of path calculation, an appropriate path which satisfies path requirements, such as delay restrictions, a request bandwidth, the redundancy of paths preparing a working path and a standby path, and the restriction on the number of hops, and which also passes through a link with a low bandwidth usage rate, and/or an appropriate path with a small number of hops.

According to a second aspect, the method in the first aspect further comprises the step of: in associating the candidate path with an abstract link of a calculation domain belonging to the second hierarchical layer, selecting, as the candidate paths, top one or more of paths which are obtained by rearranging some or all of one or more paths coupling the selected nodes on the first hierarchical layer according to each link attribute.

By limiting the number of candidate paths, which are associated with the abstract link, to the top several ones, the number of the abstract links can be limited, and further by avoiding to calculate a path based on a large number of abstract links, an increase in the amount of path calculation can be suppressed. Moreover, because higher candidate paths are selected based on a plurality of link attributes, an abstract link needed in calculating an appropriate path satisfying a plurality of requirements, which are generated when only one candidate path with the shortest path is associated as an abstract link, will not be managed and therefore the possibility can be reduced that an appropriate path cannot be selected.

According to a third aspect, the method in the first or second aspect further comprises the step of: in associating a candidate path with an abstract link, associating a plurality of candidate paths, the path attributes of which are similar in the light of a predetermined criteria, with the same abstract link.

The definition of the similar path includes, for example, both end points of paths are equal
when paths are divided into a plurality of groups according to the delay, the number of hops, the cost, the bandwidth, and the like, the paths are mapped on the same group.

For example, when candidate paths are sorted from the view point of transmission delay and link attributes and the candidate paths are mapped, the candidate path with the same link attribute (i.e., similar candidate path) is specified for example by a range of transmission delay of the candidate path, such as a link attribute 1 of the transmission delay from 0 to 15 ms, a link attribute 2 of the transmission delay from 15 to 30 ms, and a link attribute 3 with the transmission delay equal to or greater than 30 ms.

Thus, by limiting the number of the abstract links and avoiding to calculate a path based on a large number of abstract links, an increase in the amount of path calculation can be suppressed.

According to a fourth aspect, the abstract link management step of associating a plurality of candidate paths, the path attributes of which are similar, with the same abstract link according to the third aspect includes the step of holding an abstraction-level adjusting parameter for adjusting a degree of similarity.

The abstraction-level adjusting parameter indicates a threshold value of the range of transmission delay described in the third aspect. That is, these are 0, 15, and 30. Note that, the abstraction-level adjusting parameter is supposed to be specified by an administrator in advance, and is a value comprising, in addition to the transmission delay shown in the above-described example, either one type of the cost, the number of hops within a link, the bandwidth, the residual bandwidth, the accommodation rate, and the like set forth in an abstract link information table 3200, or a value comprising a combination thereof.

In associating a plurality of candidate paths, the path attributes of which are similar, with the same abstract link, even when the same number of candidate paths are associated with an abstract link and when candidate paths, the path attributes of which are not such similar, are associated as the same abstract link, the number of abstract links will decrease as compared with the case where candidate paths, the path attributes of which are extremely similar, are associated with a link attribute and thus the amount of path calculation is reduced. However, in the former as compared with the latter, an abstract link attribute will have a range of each value and therefore an appropriate abstract link cannot be selected, thus causing a possibility that an appropriate path cannot be calculated. With the fourth aspect, the possible to select the amount of path calculation and an appropriate abstract link can be adjusted and an abstract link as appropriate as possible within a range of the requested path calculation time can be selected.

According to a fifth aspect, the method in the above-described each aspect further comprises the step of holding information related to redundancy as link information on the abstract link.

Thus, when paths, in which a working path and a standby path pass through the same abstract link, are selected, an abstract link serving as a combination of link-disjoint paths, in which a working path and a standby path do not pass through the same link, can be selected.

According to a sixth aspect, the method in the first aspect further comprises the steps of: when a network topology of the real network is changed, identifying, among the candidate paths of the first hierarchical layer, a candidate path affected by the change of the network topology; and changing the abstract link to a different one.

Thus, for example, when an existing path cannot be used due to a failure and the like and thus the network topology is changed, the range to re-calculate can be limited to the selection of an abstract link and the amount of path calculation can be reduced by avoiding to re-calculate a path in an end-to-end relationship.

According to a seventh aspect, the method in the above-described each aspect further comprises the steps of: when a network system is activated or when the network topology is changed, calculating a calculation domain of the first hierarchical layer; calculating a candidate path between a plurality of boundary nodes in each domain; associating abstract link information with an abstract link of the second hierarchical layer and holding the same; and calculating a path based on the abstract link information which is held when a path request is received.

These calculations are made in advance before a path request occurs, such as when activated or when the topology is changed, so that the amount of path calculation when a path request is received can be reduced and the time after receiving a path request until a path is set can be reduced.

According to an eighth aspect, the method in the first aspect further comprises the steps of: when the network topology of the real network is changed, extracting a calculation domain of the first hierarchical layer affected by the change; re-calculating a candidate path of the extracted calculation domain and the path information; and associating the calculated path information with a link attribute of the abstract link.

Thus, when the network topology is changed, the candidate path to re-calculate and an abstract link can be limited and the amount of path calculation for calculating an abstract link when the network topology is changed can be reduced.

According to a ninth aspect, the method in the above-described each aspect further comprises the step of: in dividing the real network into a plurality calculation domains of the first hierarchical layer, dividing so that the number of boundary nodes between the calculation domains decreases.

Because this reduces the number of nodes of the second hierarchical layer, the number of candidate paths, and the number of abstract links, the amount of path calculation can be reduced.

According to a tenth aspect, the method in the above-described each aspect further comprises the step of: in displaying an operation screen, intermingling and displaying a domain displayed in the first hierarchical layer and a domain displayed in the second hierarchical layer.

Thus, a network administrator, when setting or referring to a path, can display a calculation domain, which is referred to in detail, in the first hierarchical layer and displays the other calculation domains in the second hierarchical layer. As a result, a network administrator, in a limited operation screen size, can easily view the calculation domain to refer to for details, so that a network administrator's setting error suppressing effect and an operation efficiency improvement effect are obtained.

According to an eleventh aspect, the method in the above-described each aspect further comprises the steps of: regarding one or more calculation domains of the first hierarchical layer as one abstract node in the second hierarchical layer; holding some or all of path attributes of a candidate path of the first hierarchical layer as a node attribute of an abstract node of the second hierarchical layer; and calculating a path based on the node attribute of the abstract node in calculating one or more paths coupling two or more nodes.

This enables to select, with a small amount of path calculation, an appropriate path which satisfies path requirements, such as delay restrictions, a request bandwidth, the redundancy of paths preparing a working path and a standby path, and the restriction on the number of hops, and which also passes through a link with a low bandwidth usage rate, and/or an appropriate path with a small number of hops. Furthermore, a network administrator can regard a set of a plurality of nodes of a central office or the like as one abstract node, and can sensuously easily understand the network topology of the second hierarchical layer, so that a network administrator's setting error suppressing effect and an operation efficiency improvement effect are obtained.

The disclosure herein enables to select, with a small amount of path calculation, a path which satisfies path requirements, such as delay restrictions, a request bandwidth, the redundancy of paths preparing a working path and a standby path, and the restriction on the number of hops, the path passing through a link with a low bandwidth usage rate, and/or an appropriate path with a small number of hops.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 shows a configuration example of a network which an embodiment is applied to.

FIG. 2 illustrates a hierarchical network managed by a transport control server which the embodiment is applied to.

FIG. 3 is a block diagram showing a configuration example of the transport control server which the embodiment is applied to.

FIG. 4 illustrates the configuration of abstract link information which the transport control server holds.

FIG. 5 illustrates the configuration of node/domain mapping information which the transport control server holds.

FIG. 6 illustrates the configuration of management domain information which the transport control server holds.

FIG. 7 illustrates the configuration of node information which the transport control server holds.

FIG. 8 illustrates the configuration of node connection information which the transport control server holds.

FIG. 9 illustrates the configuration of candidate path information which the transport control server holds.

FIG. 10 illustrates the configuration of a path request which the transport control server holds.

FIG. 11 illustrates the configuration of link information which the transport control server holds.

FIG. 18 shows an example of the operation screen of an administration terminal of the transport control server which the embodiment is applied to.

DETAILED DESCRIPTION OF THE EMBODIMENTS

Hereinafter, an embodiment of the disclosure is described in detail with reference to the accompanying drawings.

In the embodiment, a path of a lower hierarchical layer is associated with an abstract link of a higher hierarchical layer, and a path attribute of the lower hierarchical layer is managed as a link attribute of the higher hierarchical layer.

Figure 1:
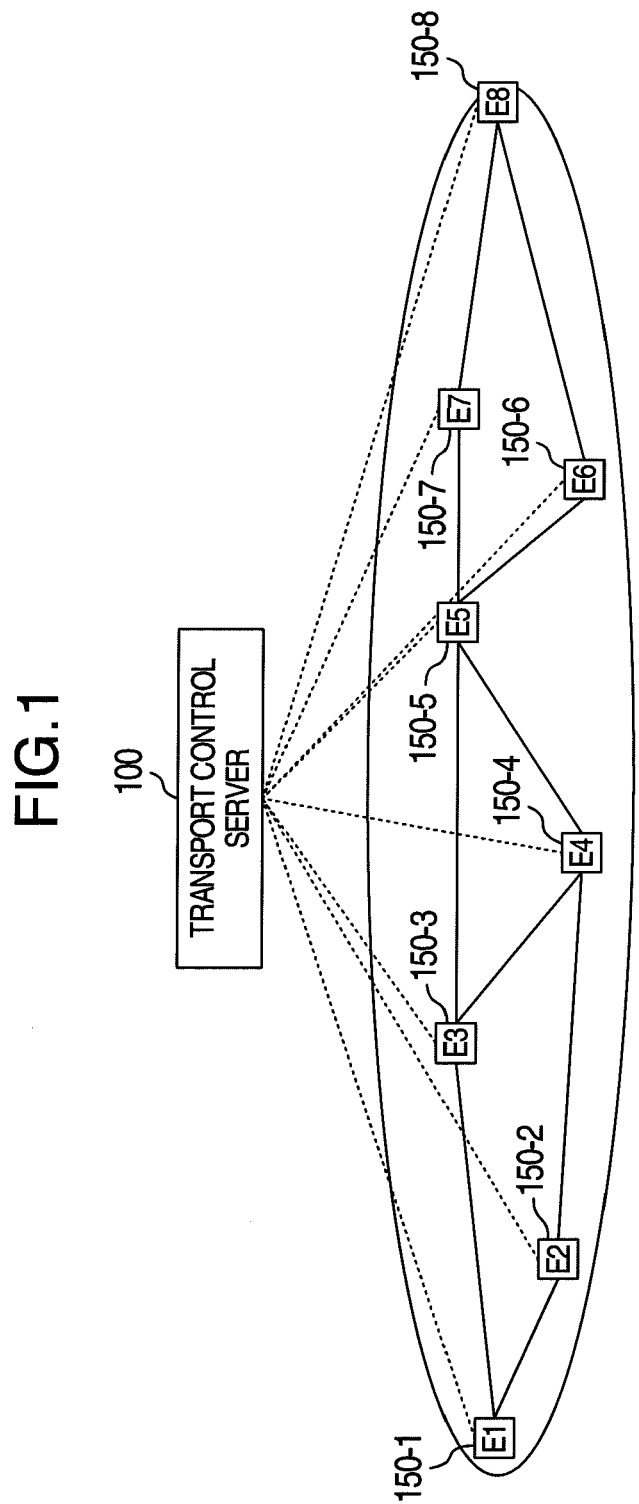

FIG. 1 is a block diagram showing the configuration of a network system in the embodiment.

The network system of a first embodiment includes a transport control server 100 and a node 150 (nodes 150-1 to 150-n). The network used in the network system of the first embodiment is a network including a plurality of network devices, such as a WAN and the Internet. Moreover, the network of the embodiment may be a virtually implemented network.

The transport control server 100 is a computer for controlling the traffic passing through the network. The transport control server 100 includes an administration terminal which provides an administrator or the like with a unit configured to display a screen and operate the system.

The transport control server 100 is coupled to the plurality of nodes 150. The transport control server 100 sets a path (i.e., communication path) coupling each node 150. Examples of the technique for setting the path include MPLS (Multi-Protocol Label Switching), MPLS-TP (MPLS Transport Profile), PBB-TE (Provider Backbone Bridge Traffic Engineering), OpenFlow, GMPLS (General MPLS), and the like. The path coupling the node 150 is set corresponding to a service, such as VPN, audio, or a motion picture, which each node 150 handles.

The node 150 is a network device managed by the transport control server 100. The node 150 is a network device, such as a router or a switch, which selects a path for traffic to pass therethrough by MPLS or the like. Moreover, the node 150 of the embodiment may be a virtually implemented switch or the like.

Figure 2:
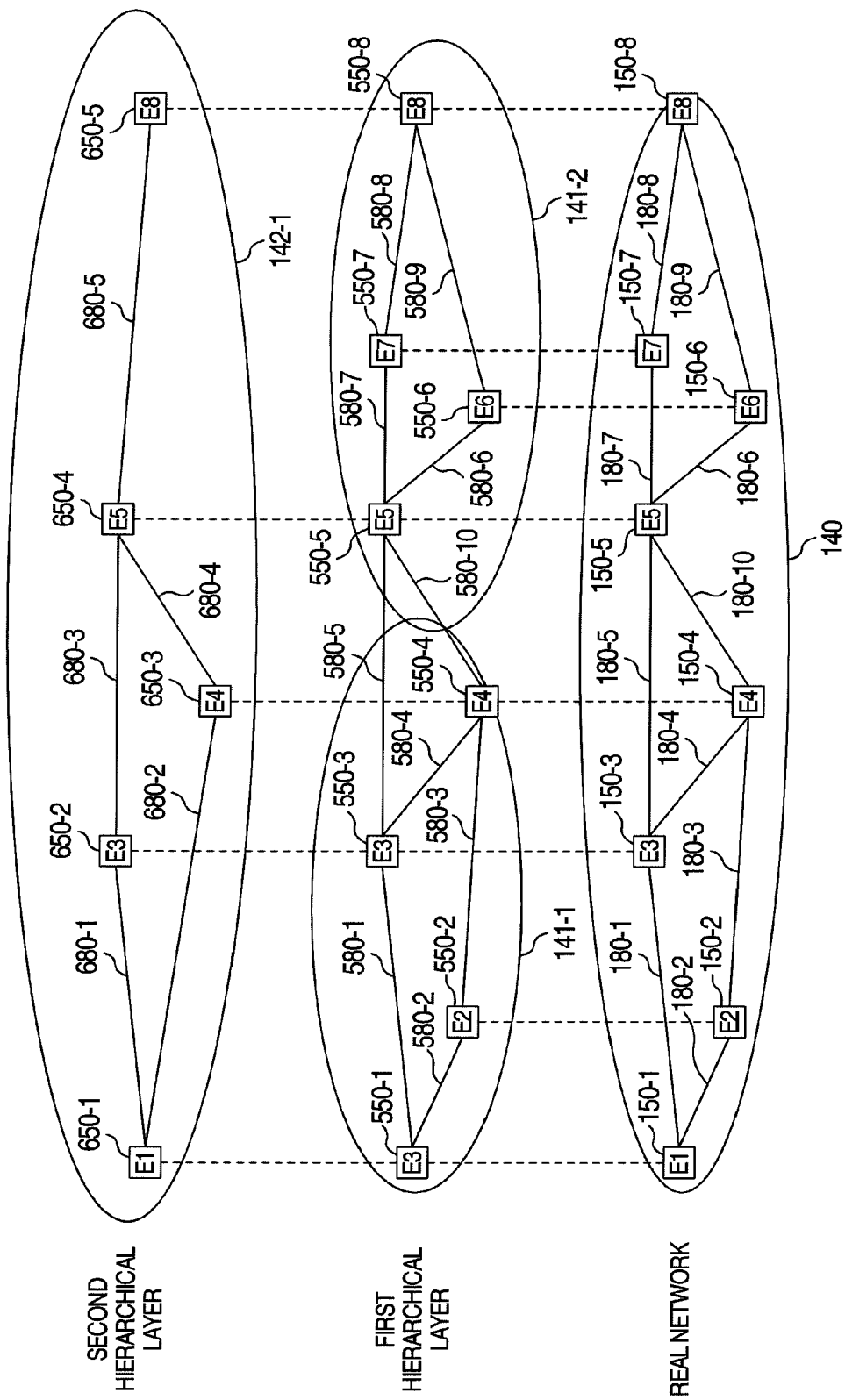

FIG. 2 is an explanatory view showing an example of calculating a path in the embodiment.

FIG. 2 comprises a real network 140 indicative of an actual network, calculation domains 141-1, 141-2 of the first hierarchical layer obtained by logically dividing the real network into a plurality of domains, and a calculation domain 142-1 of the second hierarchical layer which is an abstraction of the calculation domain of the first hierarchical layer.

The real network 140 comprises the nodes 150-1 to 150-8 and links 180-1 to 180-10 each couples the nodes.

The first hierarchical layer comprises calculation domains 141-1 and 141-2. The calculation domain 141-1 comprises nodes 550-1 to 550-4 and links 580-1 to 580-4, and the calculation domain 141-2 comprises the nodes 550-5 to 550-8 and links 580-6 to 580-9. Moreover, the links 580-5 and 580-10 couple the calculation domain 141-2 and the calculation domain 141-1. The node 550 and the link 580 of the calculation domain 141 of the first hierarchical layer are associated with the node 150 and the link 180 of the real network 140, respectively.

The calculation domain of the second hierarchical layer 142-1 comprises abstract nodes 650-1, 650-3, 650-4, 650-5, and 650-8 and abstract links 680-1 to 680-5. The abstract node 650 in the calculation domain of the second hierarchical layer 142 is associated with, among the nodes 550 of the first hierarchical layer, a boundary node between the calculation domain 141-1 and the calculation domain 141-2, or a node (a node connecting to a corporate user point, a node connecting to a network of a different communication common carrier, etc.) which may serve as a source node ID or a destination node ID in a path request to be described later.

A link 680 of the second hierarchical layer is associated with the path calculated in the first hierarchical layer. For example, a link 680-1 is associated with a path passing through the node 550-1 and the node 550-3 or with a path passing through the node 550-1, the node 550-2, the node 550-4, and the node 550-3, or with the both thereof.

Here, when the transport control server 100 accepts a path with the source node 150-1 and the destination node 150-8, as a path request from an administrator, the transport control server 100 calculates, as the abstract node 650 which passes a path from the abstract node 650-1 to the abstract node 650-5 of the second hierarchical layer based on the calculation domain 142-1 of the second hierarchical layer, a path passing through the abstract nodes 650-1, 650-2, 650-4, and 650-5 or a path passing through abstract node 650-1, 650-3, 650-4, and 650-5, or the both thereof, for example. The transport control server 100 associates the abstract link 680 to pass therethrough with the path of the first hierarchical layer, thereby calculating the node 150 and the link 180 to pass therethrough in the real network.

In the above description, separately from the cost of a path calculated in the first hierarchical layer, a path attribute is held as the link attribute of the abstract link 680 of the second hierarchical layer. Thus, for example, even when as the conditions of a path request, a condition that a delay, which is the time taken for communication data to transfer from a sender to a destination, is within approximately 30 ms of a delay restriction and a condition that a request bandwidth which is a bandwidth secured from a sender to a destination is 100 Mbps are included, a path passing through an appropriate node and abstract link can be calculated in calculating a path in the second hierarchical layer.

Figure 3:
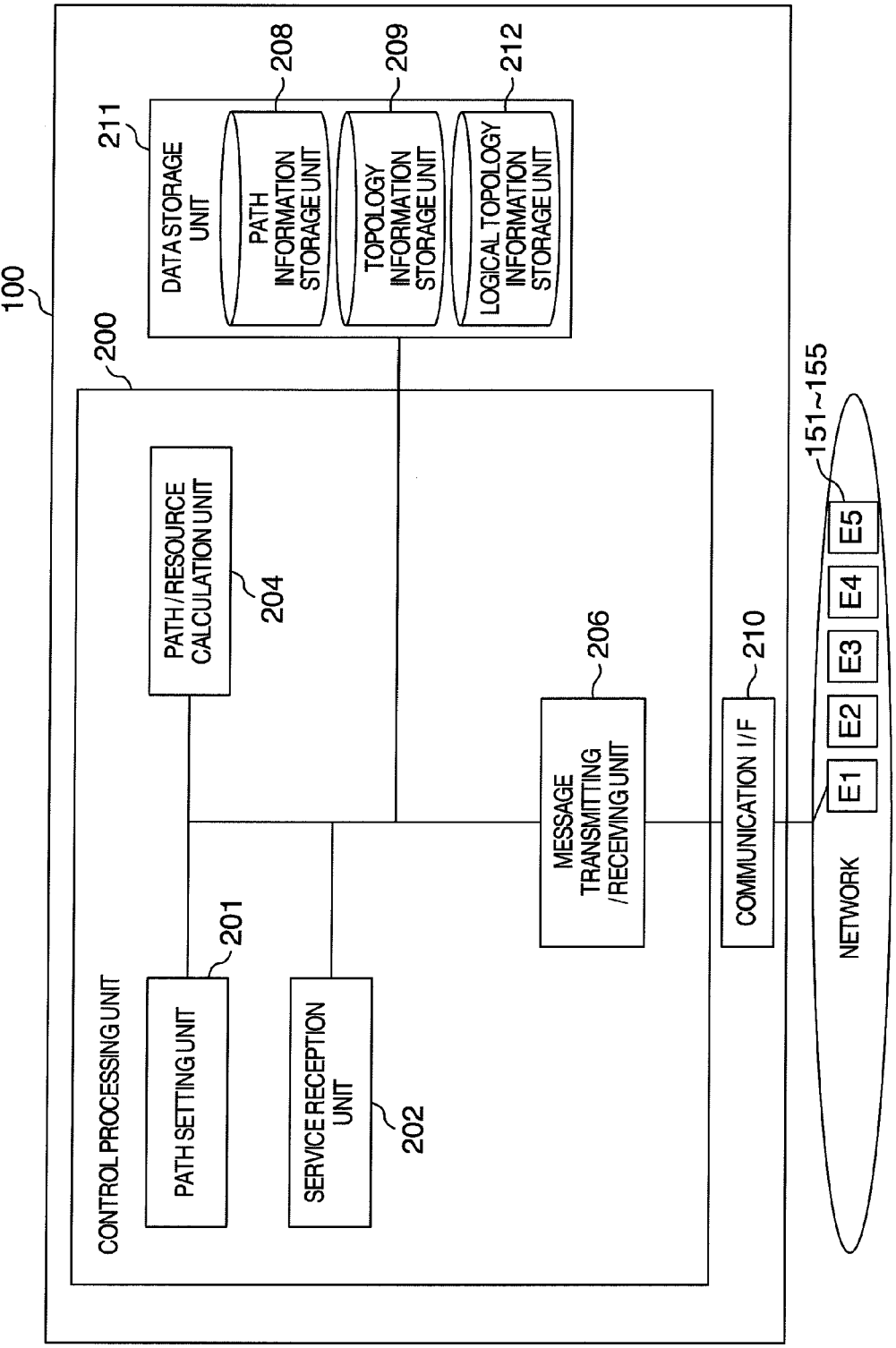

FIG. 3 is a block diagram showing the functional configuration of the transport control server 100 in the embodiment.

The transport control server 100 includes a communication IF 210, a data storage unit 211, and a control processing unit 200.

The communication IF 210 sets, eliminates, or changes a path with respect to the node 150 directly or via an EMS (Element Management System). Moreover, the communication IF 210 transmits to the node 150 a message including an instruction to transmit information which the node 150 holds, and receives a message including information from the node 150.

In the data storage unit 211, a value is referred to or a value is updated by the control processing unit 200. The data storage unit 211 is constructed in a nonvolatile storage device or the like which the transport control server 100 includes. The data storage unit 211 includes a path information storage unit 208, a topology information storage unit 209, and a logic topology information storage unit 212. Hereinafter, the information which the data storage unit 211 holds is shown.

The path information storage unit 208 is a storage unit holding the information on a path set in each node and an unset candidate path. The path information storage unit 208 holds a candidate path information table 3300 and a path request information table 3600 to be describe later.

The topology information storage unit 209 is a storage unit holding information indicative of a link, to which each node 150 is coupled, and the other node 150. The topology information storage unit 209 holds a node information table 3400, a node connection information table 3500, a management domain information table 3700, and a link information table 3900 to be described later.

The logic topology information storage unit 212 is a storage unit holding the information related to a plurality of calculation domains 141 of the first hierarchical layer obtained by logically dividing the network 140 into a plurality of domains, and to the calculation domain of the second hierarchical layer 142 obtained by abstracting this. The logic topology information storage unit 212 holds an abstract link information table 3200 and a node/domain mapping information table 3100 to be described later.

The control processing unit 200 calculates the bandwidth of each traffic with reference to a value held in the data storage unit 211, and indicates the calculated bandwidth of each traffic to the node 150. The control processing unit 200 includes the functions of a path setting unit 201, a service reception unit 202, a path/resource calculation unit 204, and a message transmitting/receiving unit 206.

The path setting unit 201 is a function to generate data in order to set a path to each node 150 based on the result which the path/resource calculation unit 204 calculated.

The path/resource calculation unit 204 is a function for calculating an abstract link based on a path request and topology information and storing the calculated path information into the data storage unit 211.

The service reception unit 202 is a function for displaying the bandwidth of traffic via the operation screen and the like of the administration terminal coupled to the transport control server 100. The service reception unit 202 may display, when requested by a network administrator, a path and an abstract link so that the data for setting the path by the path setting unit 201 is generated and the information related to the path is displayed.

The message transmitting/receiving unit 206 prepares a message for setting, changing, or eliminating a path based on the data generated by the path setting unit 201, and transmits the same to the node 150 via the communication IF 210.

Moreover, the message transmitting/receiving unit 206, when the communication IF 210 collects a message related to the information on the node 150 from the node 150, interprets the collected message and transmits the result to the path/resource calculation unit 204.

The transport control server 100 can be realized using a computer with a processor, a communication device, a volatile storage device (DRAM etc.), a nonvolatile storage device (a flash memory, a hard disk drive, etc.), and the like.

That is, the function included in the control processing unit 200 is realized by programs held in the nonvolatile storage device, which the transport control server 100 includes, being executed in the volatile storage device by the processor. Moreover, these programs may be stored in the nonvolatile storage device in advance, or may be introduced from an external device via a network or via a portable storage medium.

Figure 18:
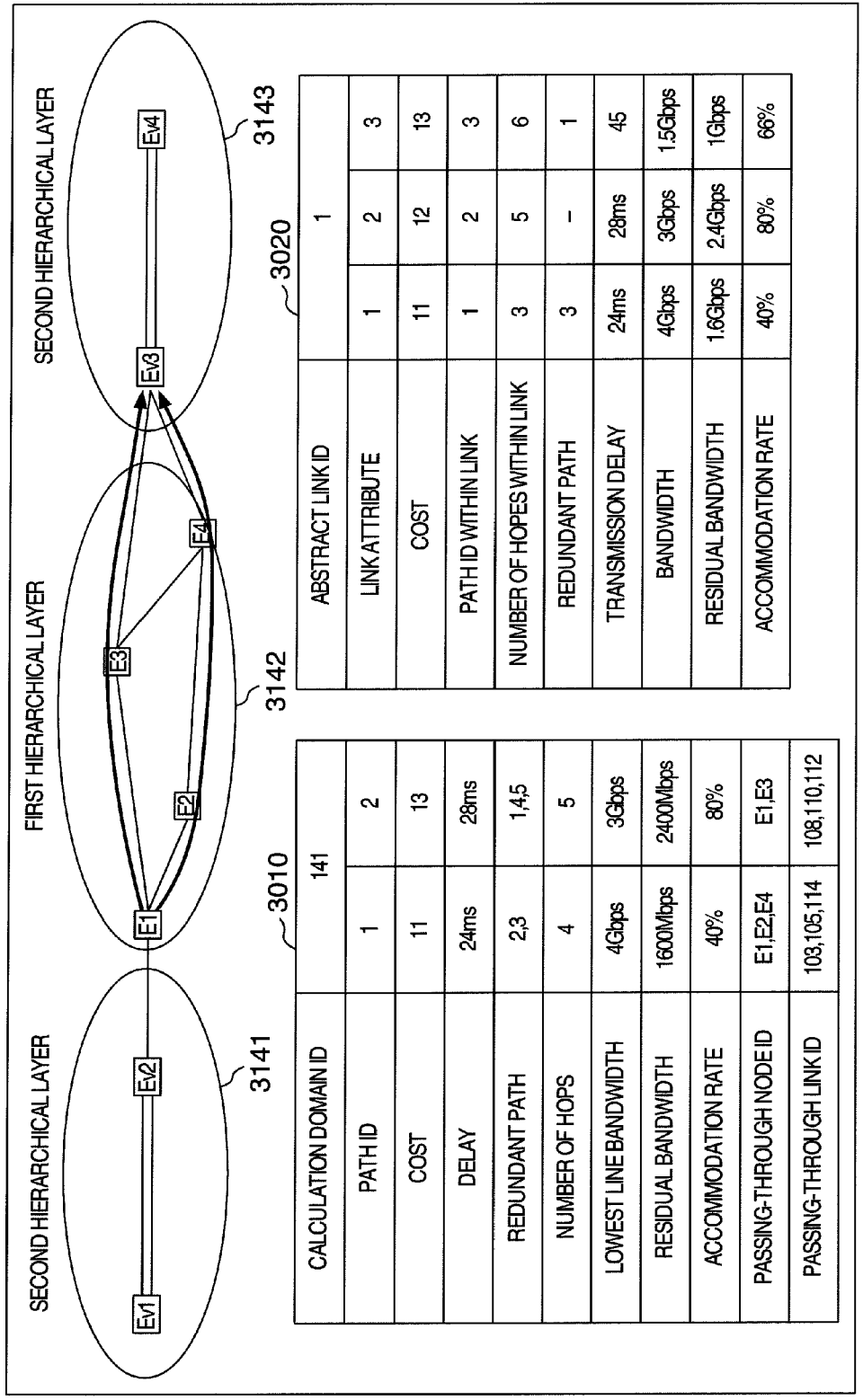

An example of the operation screen of the administration terminal is described using FIG. 18. When a network administrator sets a path, calculation domains 3141-3143 are displayed. At this time, both the calculation domain of the second hierarchical layer shown in the calculation domain 3141 or 3143 and the calculation domain of the first hierarchical layer shown in the calculation domain 3142 are displayed. Thus, a network administrator can refer to some of the calculation domains on the operation screen in detail. Thus, a network administrator can easily view, in a limited operation screen size, the calculation domains for referring to the details, so that a network administrator's setting error suppressing effect and an operation efficiency improvement effect are obtained.

Moreover, when a network administrator selects an abstract link, abstract information 3020 and the like are displayed. Thus, in the calculation domain 3141 or 3143 in which calculation is automatically made without setting in detail, a path can be selected or changed with referring to the information on an abstract link. Note that, instead of the abstract link information, abstract node information may be displayed.

Furthermore, a path selectable in the detailed calculation domain 3142 is displayed as path information 3010, so that an appropriate path can be selected taking into consideration also the information not present in a path request. Note that these displays can be realized by the data storage unit 211 holding the candidate path information table 3300 and the abstract link information table 3200 to be described later.

Hereinafter, in the embodiment, the information which the data storage unit 211 manages is described.

First, the abstract link information table 3200 and the node/domain mapping information table 3100 which the logic topology information storage unit 212 manages are described.

FIG. 4 is an explanatory view showing the abstract link information table 3200.

The abstract link information table 3200 includes a calculation domain ID, an abstract link ID, an UP-side node ID, a DOWN-side node ID, a link attribute, cost, a path ID within a link, the number of hops within a link, a redundant path, a transmission delay, a bandwidth, a residual bandwidth, an accommodation rate, and the like.

The calculation domain ID is an identifier indicative of the calculation domain 141 of the first hierarchical layer. The abstract link ID is an identifier indicative of the abstract link 680 of the second hierarchical layer. The UP-side node ID and DOWN-side node ID are nodes ID which the abstract link 680 couples to. The link attribute is an identifier for distinguishing a path group to be mapped on the abstract link 680, the path group being made by putting together paths, the feature of which are similar. The path ID within a link is an identifier for identifying a path of the first hierarchical layer to be mapped on the abstract link 680.

The number of hops within a link is the number of the nodes 550 of the first hierarchical layer which the path of the first hierarchical layer passes through. The redundant path indicates the identifier of a node-disjoint path or a link-disjoint path within a path which is the same abstract link.

The transmission delay is the maximum delay or the average delay predicted to be taken for communication data to transfer within the path. The bandwidth is the average or the minimum value of the line bandwidth of a link which the path passes through. The residual bandwidth is the average or the minimum value of the unsecured bandwidth of a link which the path passes through. The accommodation rate is a calculated value obtained by dividing the residual bandwidth by the bandwidth. Each value of the abstract link information table 3200 is calculated by domain division calculation 1030 of FIG. 12, path calculation 1130 of FIG. 13, and domain division re-calculation 1330 of FIG. 14.

Here, as the abstract link information, the information including the number of hops within a link, the transmission delay, the bandwidth, the residual bandwidth, the accommodation rate, and the like is held, so that an appropriate path can be selected taking into consideration the conditions of a path request as stated before. Moreover, the link attribute or the path ID within a link is held, so that a plurality of paths can be associated with an abstract link. Thus, in searching a plurality of paths by a breadth-first search, a depth-first search, a CBF (Constraint Bellman Ford) algorithm, a CP (Candidate Path) algorithm, or the like, a path can be searched as one link and subsequently a path can be selected based on the link attribute or the cost, so that the calculation amount in searching a path can be reduced.

Note that, when candidate paths, the path attributes of which are not such similar, are associated as the same abstract link, the number of abstract links will decrease as compared with the case where candidate paths, the path attributes of which are extremely similar, are associated with a link attribute, and therefore the amount of path calculation is reduced. However, in the former, as compared with the latter, an abstract link attribute will have a range of each value, and therefore an appropriate abstract link becomes difficult to be selected, thus causing a possibility that an appropriate path cannot be calculated. Then, the abstraction-level adjusting parameter for changing the link attribute and the mapping number of candidate paths are held, so that the degree of similarity can be adjusted between a plurality of candidate paths. Thus, the possibility to select the amount of path calculation and an appropriate abstract link can be adjusted, and an abstract link as appropriate as possible in a range of a required path calculation time can be selected.

The above abstraction-level adjusting parameter is described. For example, when candidate paths are sorted from the view point of transmission delay, and the link attributes and candidate paths are mapped, the candidate paths with the same link attribute (i.e., similar candidate paths) are specified for example by a range of transmission delay of a candidate path, such as a link attribute 1 with the transmission delay of 0-15 ms, a link attribute 2 of the transmission delay of 15-30 ms, and a link attribute 3 with the transmission delay equal to or greater than 30 ms.

Here, the abstraction-level adjusting parameter indicates a threshold value (i.e., 0, 15, 30 in the above example) of the range of the transmission delay. Note that, the abstraction-level adjusting parameter is specified by an administrator in advance, and is a value comprising, including the transmission delay shown in the above-described example, either one type of the cost, the number of hops in a link, the bandwidth, the residual bandwidth, the accommodation rate, and the like set forth in the abstract link information table 3200, or a value comprising a combination thereof.

Moreover, in the path calculation by the domain division, the abstract link information is often referred to in association with the calculation domain ID, however the calculation domain ID is included into the abstract link information table, so that for example in the case where the data storage unit 211 comprises a database, in referring to the abstract link information of an abstract link included in the calculation domain ID, the number of times of accessing the database decreases and thus the effect of speeding up the path calculation is obtained.

Furthermore, a plurality of path IDs are held as the redundant paths, so that in addition to a standby path for a first failure, a second standby path and a third standby path when a second failure and a third failure occur can be calculated with a small amount of calculation. As a result, at the time of a large-scale disaster or the like, prompt failure recovery can be made.

FIG. 5 is an explanatory view showing the node/domain mapping information table 3100.

The node/domain mapping information table 3100 includes a higher calculation domain ID, a calculation domain ID, a node ID, an edge flag, a lower calculation domain ID, the node ID of a higher calculation domain, the node ID of a lower calculation domain, and the like. In the node/domain mapping information table 3100, the higher calculation domain ID, the edge flag, and the lower calculation domain ID are calculated by the domain division calculation 1030 of FIG. 12, the path calculation 1130 of FIG. 13, and the domain division re-calculation 1330 of FIG. 14, and others are stored when the network system is built.

The higher calculation domain ID indicates the identifier of a calculation domain of a higher abstraction level. For example, when a node shown in the node ID belongs to the first hierarchical layer, the higher calculation domain indicates the second hierarchical layer, the node ID of the higher calculation domain indicates the identifier of a node in the higher calculation domain, the lower calculation domain indicates the real network, and the node ID of the lower calculation domain indicates the node identifier of a node in the real network. The node ID of a higher calculation domain and the node ID of a lower calculation domain may be the same as the node ID.

The edge flag indicates whether or not the node ID is a boundary node of the relevant calculation domain (here 141). The lower calculation domain ID, when the abstraction is performed not only in one hierarchical layer but in two or more hierarchical layers, indicates the identifier of a calculation domain of a lower abstraction level. That is, when the node indicated in the node ID belongs to the third hierarchical layer which is the abstraction of the second hierarchical layer, the lower calculation domain indicates the second hierarchical layer.

Thus, a calculation domain can be divided into multi stages and hierarchically managed, and therefore by increasing the number of hierarchical layers to manage, an increase in the amount of path calculation can be suppressed despite an increase in size of a network associated with an increase of the number of nodes.

Next, the management domain information table 3700, the node information table 3400, and the node connection information table 3500 which the topology information storage unit 209 manages are described.

FIG. 6 is an explanatory view showing the management domain information table 3700.

The management domain information table 3700 includes a management domain ID, a node ID, and the like. This table is the information on a management domain, which is obtained by logically dividing a network into a plurality of domains in order to carry out OAM (Operation Administration and Management), such as the monitoring of a failure of the network. Each value of the management domain information table 3700 is stored when the network system is built.

By utilizing this table, a calculation domain can be determined with reference to a management domain. By matching a management domain and a calculation domain or by making them similar, the procedure of dividing a calculation domain can be omitted. Moreover, because a management domain and a calculation domain are matched or similar, a network administrator can easily recognize a calculation domain and thus obtain the effects of reducing the time required for setting and of reducing setting-errors.

FIG. 7 is an explanatory view showing the node information table 3400.

The node information table 3400 includes a calculation domain ID, a node ID, an input IF, an output IF, a transfer delay, a bandwidth, a usage bandwidth, an accommodation rate, and the like. The input IF and output IF indicate the identifier of an interface, such as a port of a node. The transfer delay indicates the average time or the maximum time required to process packets within a node. The bandwidth and the usage bandwidth indicate the maximum bandwidth and the available bandwidth in a processing capability, such as a switching processing within a node, respectively. The accommodation rate is a value calculated by dividing the usage rate by the maximum bandwidth. In the node information table

Figure 12:
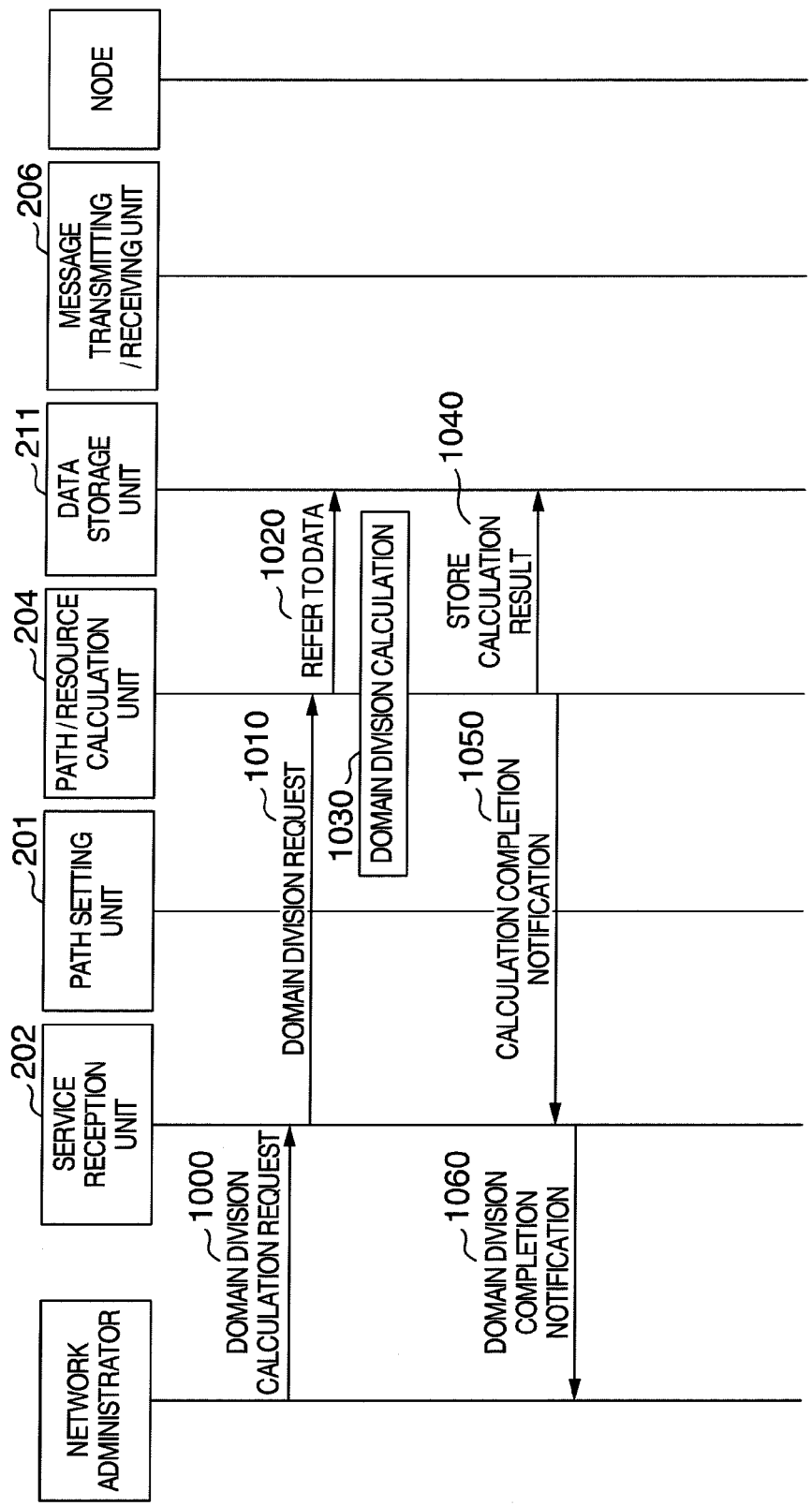
FIG. 12 is a sequence diagram illustrating the operational overview when the transport control server is initialized.
Figure 14:
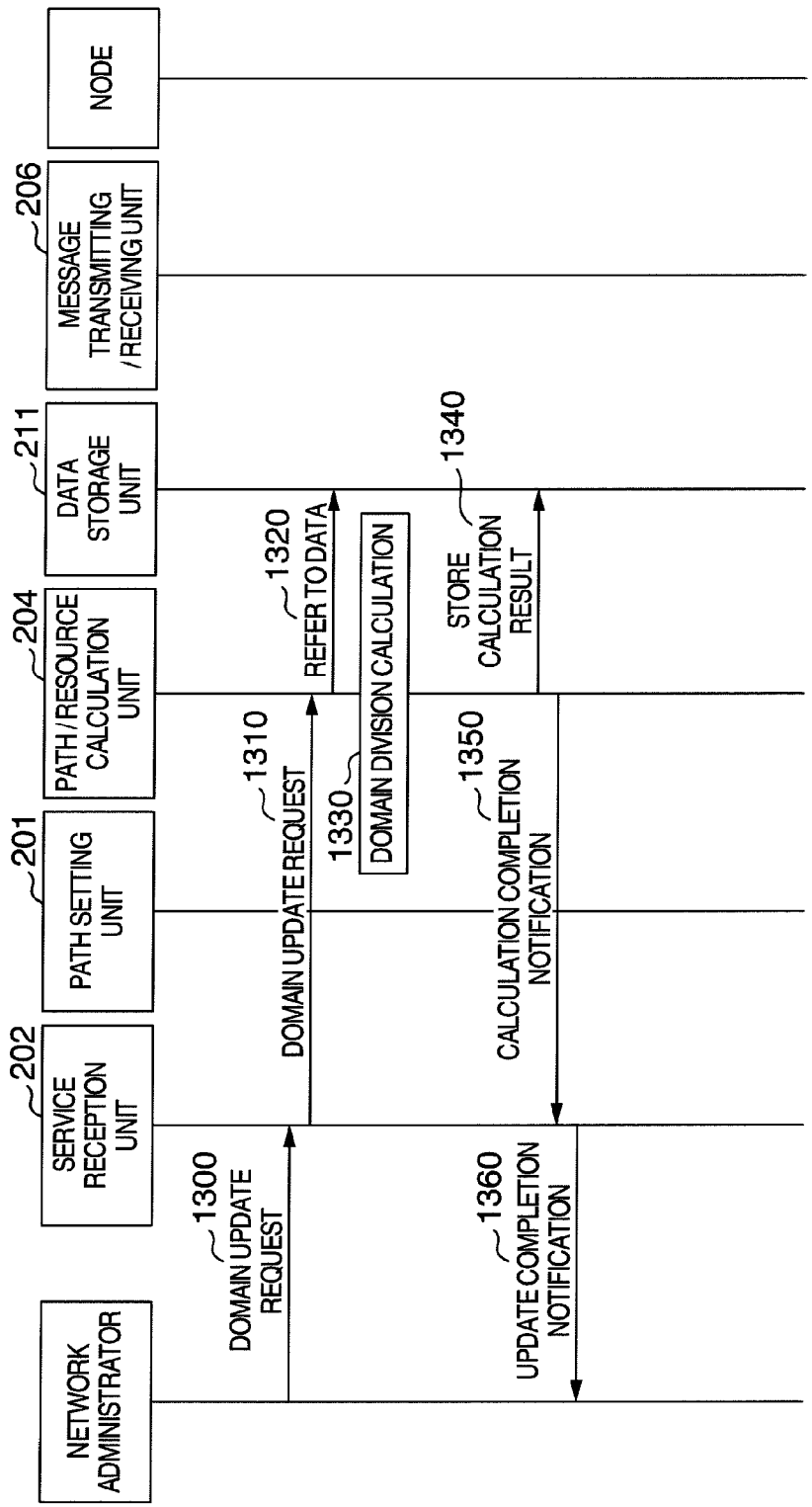
FIG. 14 is a sequence diagram illustrating the operational overview of the transport control server when a network topology is changed.

3400, the calculation domain ID is calculated by the domain division calculation 1030 of FIG. 12, and the domain division re-calculation 1330 of FIG. 14, and other values are stored when the network system is built.

In the path calculation based on the domain division, the node information is often referred to in association with the calculation domain ID, however the calculation domain ID is included in the node information and thereby for example when the data storage unit 211 comprises a database, in referring to the node information on a node included in the calculation domain ID, the number of times of accessing the database decreases and thus the effect of speeding up the path calculation is obtained.

Note that, the node information may not be in the unit of physical node, but may be a virtual node obtained by logically dividing one node into a plurality of nodes or may be a virtual node obtained by logically combining a plurality of nodes into one node. Therefore, the embodiment can be applicable also to a network virtual node which is under-study by New Generation Network Promotion Forum.

FIG. 8 is an explanatory view showing the node connection information table 3500. The node connection information table 3500 includes a calculation domain ID, a node ID, an edge flag, a port ID, a connection link ID, an adjacent node ID, a connection node port ID, and the like. The edge flag is an identifier indicating whether or not a node is a boundary node of the relevant calculation domain (here 142). The port ID and the connection link ID are an identifier of a port to be couple to an adjacent node and an identifier of a link, respectively. The adjacent node ID and the port ID of an adjacent node are an identifier of the adjacent node and an identifier of a port for the adjacent node to couple to the connection link, respectively. In the node connection information table 3500, the calculation domain ID is calculated by the domain division calculation 1030 of FIG. 12, the path calculation 1130 of FIG. 13, and the domain division re-calculation 1330 of FIG. 14, and other values are stored when the network system is built.

The node connection information table 3500 is defined as the connection information on a node and a link within a calculation domain, so that the conventional path calculation method, in which the calculation domain is not divided, can be applied to the path calculation within a calculation domain.

Note that, the node connection information may not be in the unit of physical node or link, but may be in the unit of logical node or link. Therefore, the embodiment can be applicable also to an overlay network, and a multilayer network, a software-defined network, and network virtualization under-study by New Generation Network Promotion Forum.

FIG. 11 is an explanatory view showing the link information table 3900 which the topology information storage unit 209 manages. The link information table 3900 includes a calculation domain ID, a link ID, an UP-side node ID, a DOWN-side node ID, a transmission delay, a bandwidth, a residual bandwidth, an accommodation rate, and the like. The calculation domain ID of the link information table 3900 is calculated by the domain division calculation 1030 of FIG. 12 and the domain division re-calculation 1330 of FIG. 14, and others are stored when the network system is built.

In the path calculation based on the domain division, the link information is often referred to in association with a calculation domain ID, however the calculation domain ID is included in the link information and thereby for example when the data storage unit 211 comprises a database, in referring to the link information of a link included in the calculation domain ID, the number of times of accessing the database decreases and thus the effect of speeding up the path calculation is obtained.

Note that, the link information may not be in the unit of physical link, but may be a virtual link obtained by logically dividing one link into a plurality of links or may be a virtual link obtained by logically combining a plurality of links into one link. Therefore, the embodiment can be applicable also to the network virtualization under-study by New Generation Network Promotion Forum.

Next, the candidate path information table 3300 and the path request information table 3600 which the path information storage unit 208 manages are described.

FIG. 9 is an explanatory view showing the candidate path information table 3300. The candidate path information table 3300 indicates the information related to one or more paths of the first hierarchical layer to be mapped on an abstract link of the second hierarchical layer, i.e., a calculation domain ID, a path ID, a node attribute, a cost, a delay, a link attribute, a redundant path, the number of hops, the minimum line bandwidth, a residual bandwidth, an accommodation rate, a passing-through node ID, a passing-through link ID, and the like. Each value of the candidate path information table 3300 is calculated by the domain division calculation 1030 of FIG. 12, the path calculation 1130 of FIG. 13, or the domain division re-calculation 1330 of FIG. 14.

Path information which is not employed as an abstract link is also held as a candidate path and thereby for example when a network failure or a large-scale disaster occurs and thus an already-established existing working path, a standby path, and an abstract link of a higher hierarchical layer cannot be used, a new abstract link can be generated from the candidate paths without re-searching the path, the failure recovery time can be reduced, and the load on the path calculation server can be alleviated.

Moreover, in the path calculation based on the domain division, the candidate path information is often referred to in association with the calculation domain ID, however the calculation domain ID is included in the candidate path information and thereby for example when the data storage unit 211 comprises a database, in referring to the candidate path information on a candidate path included in the calculation domain ID, the number of times of accessing the database decreases and thus the effect of speeding up the path calculation is obtained.

FIG. 10 is an explanatory view showing the path request information table 3600. The path request information table 3600 includes a path request ID, a source node ID, a destination node ID, a specified/non-specified node ID, a passing-through/non-passing-through ID, a detail-specified domain ID, priority, a delay restriction, a request bandwidth, the presence or absence of a standby path, jitter, a packet loss rate, a standby path bandwidth securing method, directivity, a candidate path, the selection of a path, and the like. Each value of the path request information table 3600 is input through the operation screen or the like by a network administrator when a path is set.

With the detail-specified domain ID, a network administrator can specify a calculation domain which is referred to in detail on the operation screen, and can display a calculation domain, which is displayed in detail, in the first hierarchical layer and display the other calculation domains in the second hierarchical layer. Thus, a network administrator can easily view, in a limited operation screen size, the calculation domain for referring to the details, so that a network administrator's setting error suppressing effect and an operation efficiency improvement effect are obtained.

FIG. 12 is a sequence diagram showing the process of logically dividing into a plurality of calculation domains, in the embodiment.

In a sequence 1000, a network administrator requests the transport control server for domain division calculation through the operation screen or the like. The domain division calculation is performed, for example, when the transport control server is initially activated, when a node or a link is added or deleted or the setting thereof is changed, and when a network failure occurs.

In a sequence 1010, the service reception unit 202 transmits a domain division request to the path/resource calculation unit 201.

In a sequence 1020, the path/resource calculation unit 204 refers to the node connection information table 3500 of the data storage unit 211. Moreover, when a calculation domain is calculated by utilizing the management domain information, the path/resource calculation unit 204 further refers to the management domain information table 3700.

In a sequence 1030, the path/resource calculation unit 204 carries out the domain division calculation, and adds a calculation result to the abstract link information table 3200, the node/domain mapping information table 3100, the candidate path information table 3300, and the node information table 3400.

Figure 15:
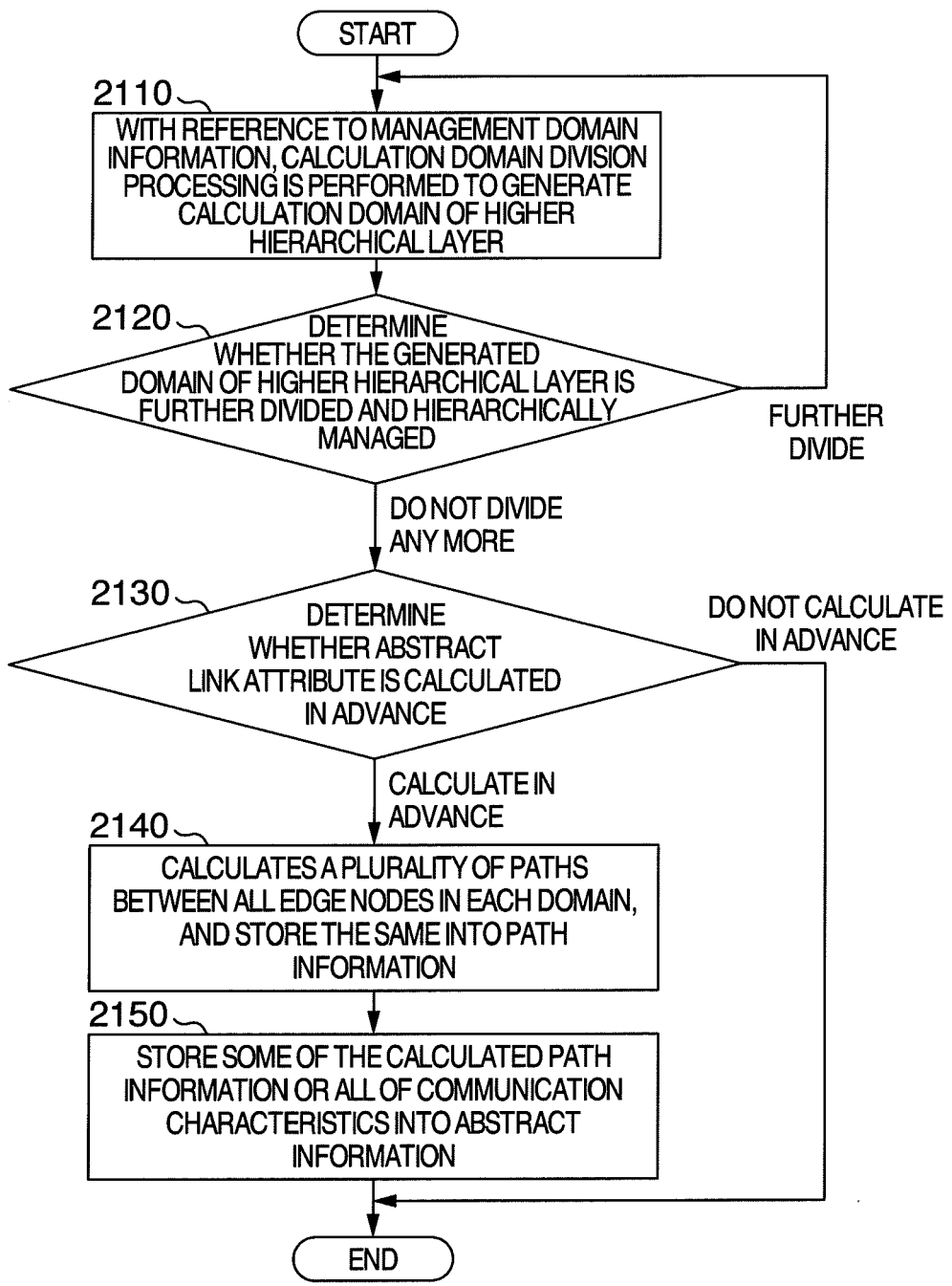
FIG. 15 is a flow chart illustrating the operational overview when a path resource calculation unit divides a domain.

The detail of the processing in the sequence 1030 is described using FIG. 15.

FIG. 15 is a flow chart showing the process for the domain division calculation in the embodiment.

In Step 2110, the path/resource calculation unit 204 recognizes the management domain ID and the node ID of the management domain information table 3700, and stores the value of the management domain ID into a field of the calculation domain ID of the node information table 3400, thereby generating a calculation domain of the higher hierarchical layer.

Similarly, the value of the management domain ID is stored also into a field of calculation domain ID of the node connection information table 3500. Moreover, similarly, the management domain ID and the node ID are stored into the higher calculation domain ID and the node ID of the node/domain mapping information, respectively, and "NO" is stored into the edge flag.

Moreover, in the node connection information table 3500, all the link IDs and calculation domain IDs in a row, in which the calculation domain ID is the same and each other's node ID is included in the adjacent node ID, are recognized. Then, the value of the management domain ID is stored into the field of the calculation domain ID in a raw, in which the link ID is the same as the recognized link ID, of the link information table 3900.

Furthermore, in the node connection information table 3500, all of the calculation domain ID, the connection link ID, the node ID, and the connection node ID in a row, in which the calculation domain ID differs and each other's node ID is included in the adjacent node ID, are recognized, and are stored into the calculation domain ID, the abstract link ID, the UP-side node ID, and the DOWN-side node ID of the abstract link information table 3200, respectively. Similarly, the calculation domain ID and the node ID of the node connection information table 3500 are stored into the calculation domain ID and the node ID of the node/domain mapping information table 3100, and "YES" is stored into the edge flag.

Note that, instead of using the management domain information, a network administrator may input each value through on the operation screen of the transport control server 100 and the path/resource calculation unit 204 may store these values.

Alternatively, the path/resource calculation unit 204 may store a result which is calculated based on the domain division algorithm instead of using the management domain information. As an example of the domain division algorithm, a graph clustering algorithm represented by an NEWMAN algorithm used for community analysis of SNS (SOCIAL NETWORK SYSTEM) or the like can be utilized. When these algorithms are utilized for calculation, a calculation domain is calculated so that the number of boundary nodes of a calculation domain decreases, and therefore the number of nodes of the second hierarchical layer decreases and the amount of path calculation in the second hierarchical layer can be reduced.

In Step 2120, the path/resource calculation unit 204 determines whether to or not to further divide and hierarchically manages each generated domain of the higher hierarchical layer, by comparing the number of nodes or the number of links within the calculation domain with a predetermined threshold value. When it is determined to further divide, new rows as many as the number of node IDs belonging to a calculation domain ID to be further divided are generated and this calculation domain ID is stored into the lower calculation domain ID in the node/domain mapping information table 3100, and the flow proceeds to Step 2110. When the flow proceeds to Step 2110, in updating the node/domain mapping information table 3100, the relevant data is added to a row which is newly added in Step 2120. When it is determined not to divide any more, the flow proceeds to Step 2130.

In Step 2130, the path/resource calculation unit 204 determines whether the abstract link attribute is calculated in advance, based on the value specified in advance by a network administrator. If the abstract link attribute is not calculated in advance, the process is terminated. If the abstract link attribute is calculated in advance, the flow proceeds to Step 2140.

The abstract link attribute is calculated and held in advance, so that there is no need to calculate the abstract link attribute every time a path passing through the same abstract link is set, and the transport control server 100 can, upon receipt of a path request, promptly calculate a path. For example, in the case of a large-scale failure or a large-scale disaster in which specially a large number of paths cannot be used, the transport control server 100 can, when other abstract link can be used, calculate a path based on the already calculated link attribute. Therefore, the time taken to calculate a plurality of paths is significantly reduced, thus enabling to recover in a short communication interruption time.

In Step 2140, the path/resource calculation unit 204 calculates a plurality of paths between all the edge nodes in each domain, and stores the same into the path information. Specifically, the path/resource calculation unit 204 recognize the calculation domain ID, the abstract link ID, and the UP-side node ID, and the DOWN-side node ID of the abstract link information table 3200, and calculate a path with the end points of the UP-side node ID and the DOWN-side node ID, with reference to a row, in which the calculation domain ID is the same as that of the node connection information table 3500.

As the path calculation method, for example a plurality of paths are calculated by breadth-first search, and the calculation results are stored into the path ID, the cost, the delay, the redundant path, the number of hops, the minimum line bandwidth, the residual bandwidth, the accommodation rate, the passing-through node ID, and the passing-through link ID of the candidate path information table 3300. Hereinafter, the calculated path is referred to as a candidate path.

Note that, in calculating by breadth-first search, the calculation of a path, wherein a total delay of the nodes or links which the path passes through or the number of nodes to pass through reaches a certain constraint value, currently being searched may be stopped so as to limit and calculate the number of paths to calculate. Thus, the amount of path calculation and the amount of information held as a candidate path can be reduced.

In Step 2150, the path/resource calculation unit 204 rearranges the candidate paths stored in Step 2140 according to the magnitude of either one or more of the cost, the delay, the number of redundant paths, the number of hops, the minimum line bandwidth, the residual bandwidth, and the accommodation rate of the candidate path information table 3300. Then, while being rearranged with each value, each item of the information on predetermined top-several paths, i.e., each of the path ID, the cost, the number of hops, the redundant path, the delay, the minimum line bandwidth, the residual-bandwidth, the accommodation rate, and the like is stored into the corresponding each item in the row, which was previously referred to in Step 2140, of the abstract link information table 3200, i.e., into the path ID within a link, the cost, the number of hops within a link, the redundant path, the transmission delay, the bandwidth, the residual bandwidth, the accommodation rate and the like (the path ID corresponds to the path ID within a link). Furthermore, the same value is stored into the link attribute of the candidate path information table 3300 and the link attribute of the abstract link information table 3200. For a path which has not been selected as the predetermined top-several paths, the abstract link ID is stored into the link attribute of a row, in which the end points of the path are the UP-side node ID and the DOWN-side node ID of the candidate path information table 3300.

This enables to associate a candidate path with an abstract link. Moreover, in each of the cost, the delay, the number of hops, the minimum line bandwidth, the residual bandwidth, and the accommodation rate among candidate path information, top-several candidate paths are held as a link attribute, so that the path/resource calculation unit 204 can select an abstract link with an appropriate link attribute satisfying the various requirements, such as delay restrictions, the request bandwidth, the presence or absence of a standby path, and the like shown in the path request information table 3600.

Moreover, because an abstract link is calculated based on the path search, a node which, when a network administrator sets a path, may be specified as the source node ID or the destination node ID serves as an end point of the path. Therefore, the above-described path remains as a node in the second hierarchical layer, so that a node serving as an end point of the path in the second hierarchical layer can be recognized without referring to the first hierarchical layer when the path is set.

The above is the detailed description of the sequence 1030. Now, return to the description of FIG. 12.

In the sequence 1040, the path/resource calculation unit 204 stores the abstract link information table 3200, the node/domain mapping information table 3100, the node information table 3400, the node connection information table 3500, and the candidate path information table 3300 into the data storage unit 211.

In a sequence 1350, the path/resource calculation unit 204 transmits a calculation completion notification to the service reception unit 202.

In a sequence 1360, the service reception unit 202 notifies a network administrator of a network update completion notification through the operation screen of the transport control server 100.

Figure 13:
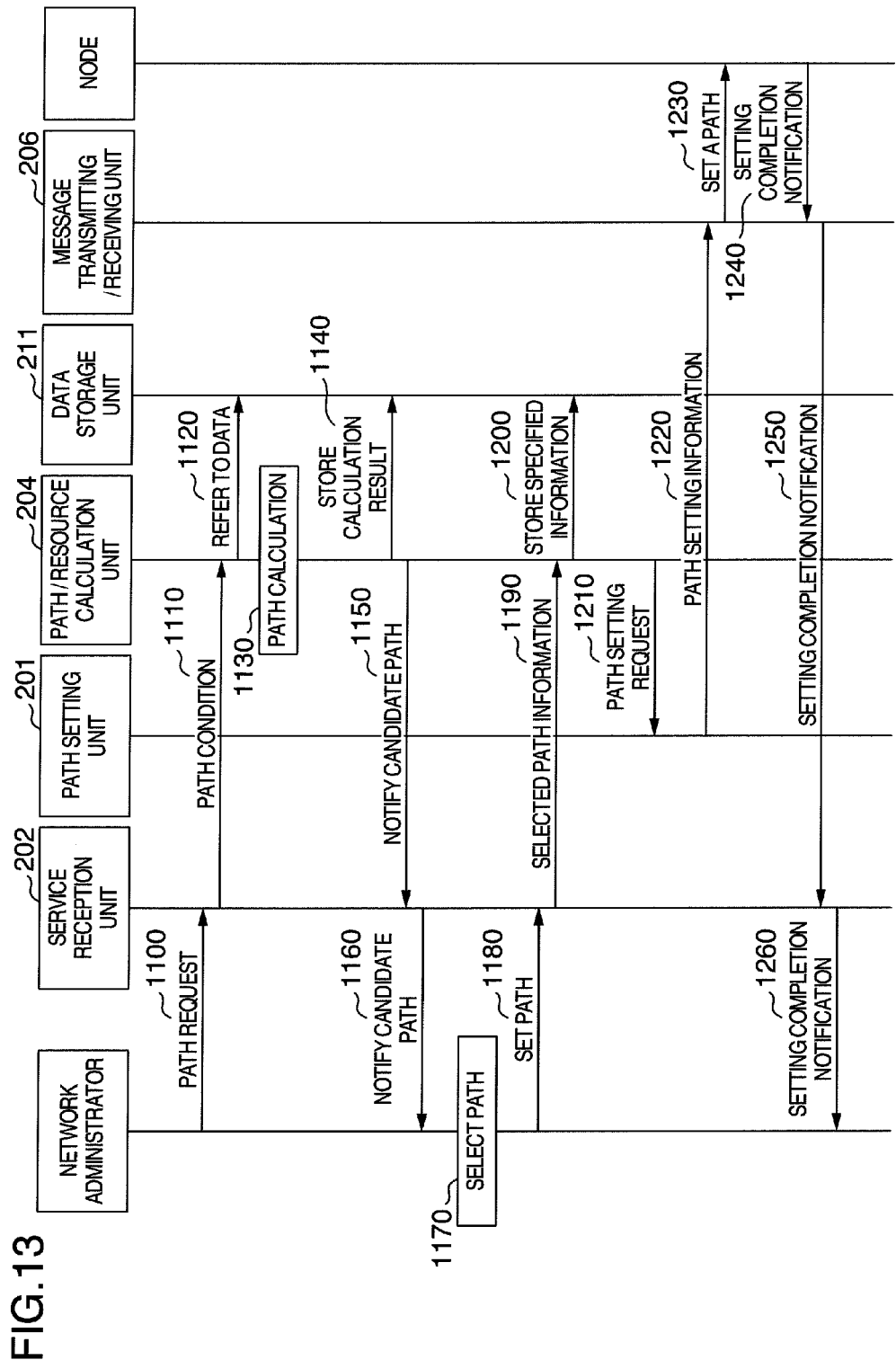
FIG. 13 is a sequence diagram illustrating the operational overview of the transport control server when setting a path.

FIG. 13 is a sequence diagram showing the process of setting a path in the embodiment.

In a sequence 1100, a network administrator passes a path request 1100 to the service reception unit through the operation screen of the transport control server 100. The content of the path request is the path request information table 3600, for example.

In a sequence 1110, the service reception unit 202 passes a path condition 1110, which is the information received in the sequence 1100, to the path setting unit 201.

In a sequence 1120, the path/resource calculation unit 204 recognizes the abstract link information table 3200, the node/domain mapping information table 3100, the node information table 3400, the node connection information table 3500, and the candidate path information table 3300 with reference to the data storage unit 211.

In a sequence 1130, the path/resource calculation unit carries out path calculation. The detail of the processing in the sequence 1130 is described using FIG. 16.

Figure 16:
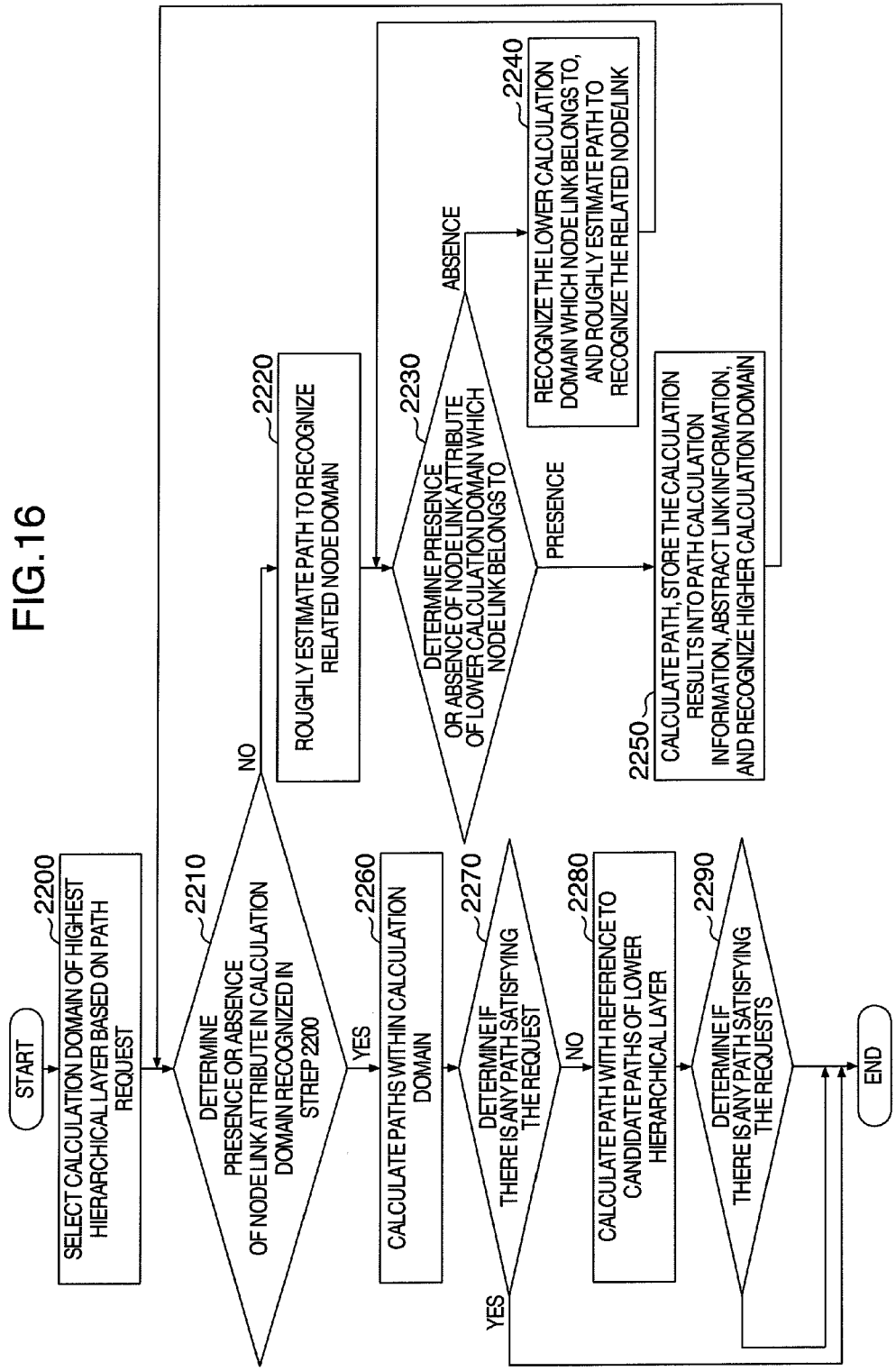
FIG. 16 is a flow chart illustrating the operational overview when the path resource calculation unit selects a path.

FIG. 16 is a flow chart showing the process of calculating a path in the embodiment.

In Step 2200, the path/resource calculation unit 204 selects a domain of the highest hierarchical layer based on the path request. Specifically, the path/resource calculation unit 204 recognizes the source node ID and the destination node ID of the path request information table 3600. Then, with reference to the node ID of the node/domain mapping information table 3100 and the node ID of the higher calculation domain, the path/resource calculation unit 204 selects a calculation domain to which each belongs from the higher calculation domain ID of the node/domain mapping information table 3100. When a plurality of higher calculation domain IDs have been selected, a higher calculation domain ID of the lowest hierarchical layer is selected.

Thus, a region for path calculation can be limited and the amount of path calculation can be reduced.

In Step 2210, the path/resource calculation unit 204 determines the presence or absence of a node/link attribute. Specifically, in the abstract link information table 3200, the path/resource calculation unit 204 determines whether or not a value is already stored in the link attribute of a row, in which the calculation domain ID, the UP-side node ID, and the DOWN-side node ID are the higher calculation domain ID selected in Step 2200 and the source node ID and the destination node ID of the path request information table 3600. If a value is already stored (if there is a value), the flow proceeds to Step 2260. If a values is not stored yet (if there is no value), the flow proceeds to Step 2220.

In Step 2220, the path/resource calculation unit 204 calculates a plurality of paths, the end points of which are the source node ID and the destination node ID of the path request information table 3600, for example by breadth-first search and recognizes the passing-through node and passing-through link which the paths pass through.

By extracting the related node and link, the link attribute of a lower calculation domain to calculate can be limited and the amount of path calculation can be reduced.

In Step 2230, the path/resource calculation unit 204, with reference to the node/domain mapping information table 3100, recognizes the lower calculation domain ID which the node ID recognized in the previous step (in Step 2220 or Step 2240) belongs to). Then, with reference to the abstract link information table 3200, the path/resource calculation unit 204 determines whether or not the link attribute of an abstract link ID belonging to the recognized lower calculation domain ID is already stored, thereby determining the presence or absence of the link attribute of the abstract link belonging to the lower calculation domain ID. If the link attribute is already stored, the flow proceeds to Step 2250. If the link attribute is not stored yet, the flow proceeds to Step 2240.

In Step 2240, the path/resource calculation unit 204, with reference to the node/domain mapping information table 3100, recognizes a lower calculation domain of the node ID and the abstract link ID which were referred to in Step 3200. In the recognized domain, the path/resource calculation unit 20 calculates a plurality of paths, the end points of which are the UP-side node ID and DOWN-side node ID of the abstract link information table 3200, for example by breadth-first search and recognizes the passing-through node and passing-through link which the paths pas through. Then, the flow proceeds to Step 2230.

In Step 2250, the path/resource calculation unit 204 calculates a plurality of paths for example by breadth-first search and stores the calculation results into the path ID, the cost, the delay, the redundant path, the number of hops, the minimum line bandwidth, the residual bandwidth, the accommodation rate, the passing-through node ID, and the passing-through link ID of the candidate path information table 3300.

Furthermore, the path/resource calculation unit 204 rearranges the stored candidate paths according to the respective magnitudes of the cost, the delay, the number of redundant paths, the number of hops, the minimum line bandwidth, the residual bandwidth, and the accommodation rate of the candidate path information table 3300. Then, with the stored candidate paths rearranged according to each value, the path/resource calculation unit 204 stores the path ID, the cost, the number of hops, the redundant path, delay, the minimum line bandwidth, the residual bandwidth, and the accommodation rate of the predetermined top-several paths into the path ID within a link, the cost, the number of hops within a link, the redundant path, the transmission delay, the bandwidth, the residual bandwidth, and the accommodation rate of the row previously, which were referred to in this step of the abstract link information table 3200, and stores the same value into the link attribute of the candidate path information table 3300 and the link attribute of the abstract link information table 3200. Then, the flow proceeds to Step 2210.

In Step 2250, the calculated top-several paths are stored as the candidate paths and the abstract link attributes, so that a path can be calculated without carrying out the same calculation in re-calculating a path passing through the same abstract link. Note that, also when top-several paths are stored in the Steps 2140, 2150 of FIG. 15, the same effect is obtained.

In Step 2210, if there is a node link attribute, then in Step 2260 the path/resource calculation unit 204, with reference to the abstract link information table 3200, determines whether or not the link attribute, the UP-side node ID and DOWN-side node ID of which are the source node ID and the destination node ID of the path request information table 3600, is already stored. If there is the link attribute, the path/resource calculation unit 204 recognizes the abstract link ID, the link attribute, the cost, the number of hops within a link, the redundant path, the transmission delay, the residual bandwidth, and the accommodation rate in the same row.

If the link attribute is not stored yet, the path/resource calculation unit 204 calculates a plurality of paths, the end points of which are the source node ID and the destination node ID of the path request information table 3600 for example by breadth-first search. Then, the path/resource calculation unit 204 stores the calculation results into the path ID, the cost, the delay, the redundant path, the number of hops, the minimum line bandwidth, the residual bandwidth, the accommodation rate, the passing-through node ID, and the passing-through link ID of the candidate path information table 3300.

In Step 2270, the path/resource calculation unit 204 extracts, if there are a plurality of paths matching the conditions of the path request information table 3600, the plurality of paths among the paths calculated in Step 2260. If there is a path matching the conditions, the process is terminated. If there is no path matching the conditions, the flow proceeds to Step 2280.

In Step 2280, the path/resource calculation unit 204 regards the candidate path information, in which the link attribute of each abstract link is the abstract link ID, as a link together with the abstract link information, and calculates a path. The path calculation method is the same as that in Step 2260.

In Step 2290, the path/resource calculation unit 204 determines if the path calculated in Step 2280 satisfies the path request, as with Step 2270. If there is no path satisfying the path request, the path calculation has failed. Then, the process is terminated.

The above is the detailed description of the sequence 1130. Now, return to the description of FIG. 13.

In Step 1140, the path/resource calculation unit 204 stores the calculation result into the data storage unit 211. Note that, as shown in FIG. 16, the calculation result may be stored into the data storage unit 211 in the course of the calculation.

In a sequence 1150, the path/resource calculation unit 204 passes the candidate paths calculated in the sequence 1130 to the service reception unit 202.

In a sequence 1160, the service reception unit 202 notifies a network administrator of the calculation result through the operation screen or the like of the transport control server 100.

In a sequence 1170, a network administrator selects, from the calculated candidate paths, a path to set through the operation screen or the like of the transport control server 100. In this case, on the operation screen, the calculation domain displayed in the first hierarchical layer and the calculation domain displayed in the second hierarchical layer are intermingled and displayed.

Thus, a network administrator, in setting or referring to a path, can display a calculation domain to be referred to in detail in the first hierarchical layer and display other calculation domain in the second hierarchical layer. As a result, a network administrator, in a limited operation screen size, can easily view the calculation domain to refer to the detail, so that a network administrator's setting error suppressing effect and an operation efficiency improvement effect are obtained.

In a sequence 1180, a network administrator notifies the service reception unit 202 of the set path through the operation screen or the like of the transport control server 100.

In a sequence 1190, the service reception unit 202 passes the selected-path information received in the sequence 1180 to the path/resource calculation unit 204.

In a sequence 1200, the path/resource calculation unit 204 stores the selected-path information into the data storage unit 211.

In a sequence 1210, the path/resource calculation unit 204 passes a path setting request to the path setting unit 201.

In a sequence 1220, the path setting unit 201 generates path setting information, and passes the path setting information to the message transmitting/receiving unit 206.

In a sequence 1230, the message transmitting/receiving unit 206 sets a path to the node 150. In this case, the path may be set through an EMS (ELEMENT MANAGEMENT SYSTEM).

In a sequence 1240, the node 150 passes a setting completion notification to the message transmitting/receiving unit 206.

In a sequence 1250, the message transmitting/receiving unit 206 passes the setting completion notification to the service reception unit 202.

In a sequence 1260, the service reception unit 202 notifies completion of the setting through the operation screen or the like of the transport control server 100.

FIG. 14 is a sequence diagram showing the process which is carried out in changing the network topology in the embodiment.

In a sequence 1300, a network administrator passes a domain update request to the service reception unit through the operation screen of the transport control server 100. The domain update request includes update node connection information, update link information, and update node information. The items of the update node connection information, the update link information, and the update node information are the same as the items of the node connection information table 3500, the link information table 3900, and the node information table 3400, respectively, in which the information having been updated as the value is included.

In a sequence 1310, the service reception unit 202 passes the domain update request, which is the information received in the sequence 1300, to the path/resource calculation unit 204.

The path/resource calculation unit 204 may receive, not from a network administrator, the update node connection information, the update link information, and the update node information which the message transmitting/receiving unit 206 collected and generated from the node 150.

In a sequence 1320, the path/resource calculation unit 204, with reference to the data storage unit 211, recognizes the abstract link information table 3200, the node/domain mapping information table 3100, the node information table 3400, the node connection information table 3500, and the candidate path information table 3300.

In a sequence 1130, the path/resource calculation unit 204 carries out domain division re-calculation. The detail of the processing in the sequence 1130 is described using FIG. 17.

Figure 17:
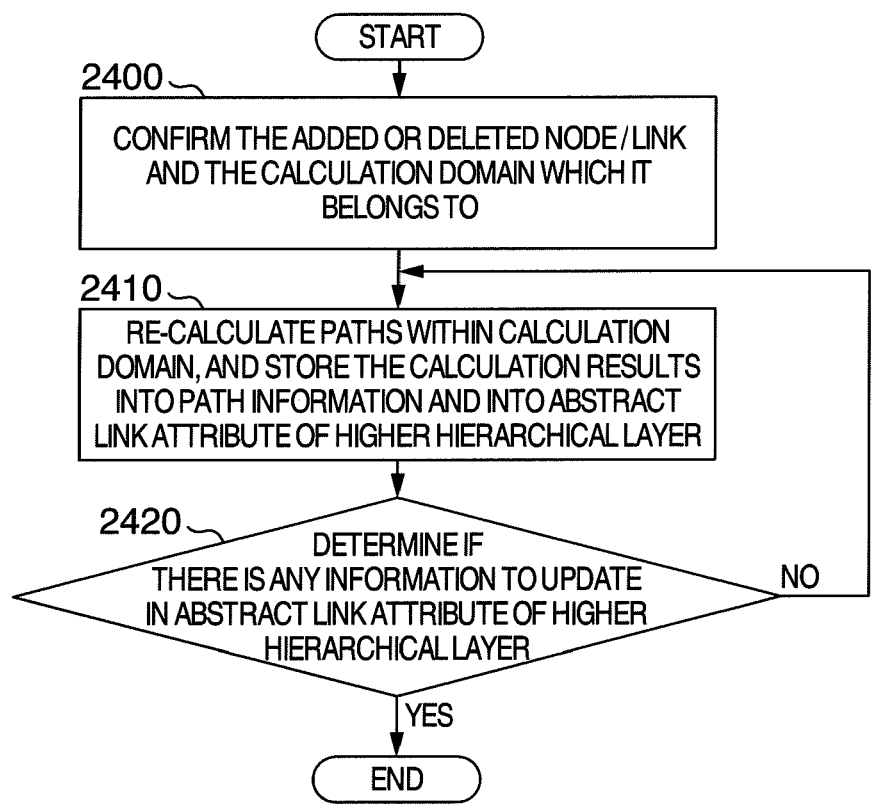
FIG. 17 is a flow chart illustrating the operational overview when the path resource calculation unit updates the topology.

FIG. 17 is a flow chart showing the process of dividing and re-calculating a domain in the embodiment.

In Step 2400, the path/resource calculation unit 204 compares the update node connection information, the update link information, and the update node information with the contents of the node connection information table 3500, the link information table 3900, and the node information table 3400, and selects a calculation domain ID in which a different content is included.

In Step 2410, the path/resource calculation unit 204 re-calculates a path within the calculation domain, stores the path into the path information, and stores the same into a higher-level abstract link attribute. The path calculation method within a domain is the same as that of Steps 2120-2160 of FIG. 15.

In Step 2420, the path/resource calculation unit 204 determines whether there is information to update in the abstract link attribute of the higher hierarchical layer. If there is information to update, the flow proceeds to Step 2410. If there is no information to update, the process is terminated.

The above is the detailed description of the sequence 1330. Now, return to the description of FIG. 14.

In a sequence 1340, the result calculated in the sequence 1330 is stored into the data storage unit 211.

In a sequence 1350, the path/resource calculation unit 204 passes a calculation completion notification to the service reception unit 202.

In a sequence 1360, the service reception unit 202 provides the update completion notification to a network administrator through the operation screen or the like of the transport control server 100.

Note that, in the above-described embodiment, a path of a lower hierarchical layer is associated with an abstract link of a higher hierarchical layer, and a path attribute of the lower hierarchical layer is managed as a link attribute of the higher hierarchical layer, however some or all of the calculation domains of the lower hierarchical layer may be regarded as one abstract node of the higher hierarchical layer, and a path attribute of the lower hierarchical layer may be managed as a node attribute of the higher hierarchical layer.

Although the present disclosure has been described with reference to example embodiments, those skilled in the art will recognize that various changes and modifications may be made in form and detail without departing from the spirit and scope of the claimed subject matter.

We claim:

1. In a path calculation method in a hierarchical network, the hierarchical network comprises both a real network and an abstraction network, the real network comprising a plurality of real nodes and a plurality of real links for connecting each of the real nodes, the abstraction network comprising both a plurality of abstract nodes and a plurality of abstract links for connecting each of the plurality of abstract nodes, one of the plurality of abstract nodes being associated with either one of or with both the real node having been selected under a predetermined criteria, each of the abstract links corresponding to a group of predetermined real paths, a predetermined real path being configured, with one or more real links for connecting two of the real nodes, which limits a number of the abstract links and avoids a calculation of a path based upon the number of the abstract links, so as to suppress the amount of path calculations, the method comprising the steps of:
generating, by a processor, a set of abstract link information based on a plurality of items of one or more real path information having been selected from a predetermined real path information of the predetermined real path,
calculating, by the processor, real path information on the real path for connecting two of the plurality of real nodes, with which the one or more of the abstract node have been associated, having been indicated by a path request information, by using the set of abstract link information, comparing the path request information with the set of abstract link information on the plurality of items,
selecting, by the processor, one or more connections of one or more of the abstract links which meets with the path request information with a plurality of items, and
further selecting, by the processor, with a path calculation that limits the number of the abstract links and avoids the calculation of the path based upon the number of the abstract links, so as to suppress the amount of path calculations, one or more real paths in one or more abstract links corresponding to a connection of one or more of the abstract links which meets with the path request information with a plurality of items.

2. The method according to claim 1, wherein the selected real path used for generating the abstract link information is selected from the one or more paths as one or more candidates.

3. The method according to claim 2, wherein the selection is made according to another predetermined criteria for selecting a plurality of real paths, to the path information, of which are similar with each other.

4. The method according to claim 3, wherein the another predetermined criteria is adjustable in accordance with an abstract-level adjusting parameter for adjusting a degree of similarity.

5. The method according to claim 1, further comprising the steps of, when a network system is activated or when a network topology of the real network is changed, generating and holding the abstract link information, and calculating a path on the basis of the abstract link information having been held when a path request is received.

6. In a path calculation method in a hierarchical network, the hierarchical network comprises both a real network and an abstract ion network, the real network comprising a plurality of real nodes and a plurality of real links for connecting each of the real nodes, the abstraction network comprising both a plurality of abstract nodes and a plurality of abstract links for connecting each of the plurality of abstract nodes, one of the plurality of abstract nodes being associated with either one of or with both of the real node having been selected under a predetermined criteria or the real nodes having been connected with each other by a real link, each of the abstract links corresponding to a group of predetermined real paths, a predetermined real path being configured, with one or more real links for connecting two of the real nodes, the method comprising the steps of:
generating, by a processor, a set of abstract link information based on a plurality of items of one or more real path information having been selected from a predetermined real path information of the predetermined real path;
calculating, by the processor, real path information on the real path for connecting two of the plurality of real nodes, with which the one or more of the abstract node has been associated, having been indicated by a path request information, by using the set of abstract link information, connection of abstract links; specifying, by a processor, a calculation domain of a first hierarchical layer to which the real node of the real network has been added or deleted;
re-calculating, by a processor, a real path information of the calculation domain having been specified; and
re-generating, by a processor, the abstract link information of the abstract link,
wherein the set of abstract link information includes information redundancy, and the abstract link with which each of the real paths, with being added or deleted a link is associated, is defined in response to a change of a network topology of the real network, and link attribute of the abstract link is changed.

7. In a path calculation method in a hierarchical network, the hierarchical network comprises both a real network and an abstract ion network, the real network comprising a plurality of real nodes and a plurality of real links for connecting each of the real nodes, the abstraction network comprising both a plurality of abstract nodes and a plurality of abstract links for connecting each of the plurality of abstract nodes, one of the plurality of abstract nodes being associated with either one of or with both of the real node having been selected under a predetermined criteria or the real nodes having been connected with each other by a real link, each of the abstract links corresponding to a group of predetermined real paths, a predetermined real path being configured, with one or more real links for connecting two of the real nodes, the method comprising the steps of:
generating, by a processor, a set of abstract link information based on a plurality of items of one or more real path information having been selected from a predetermined real path information of the predetermined real path;
calculating, by the processor, real path information on the real path for connecting two of the plurality of real nodes, with which the one or more of the abstract node has been associated, having been indicated by a path request information, by using the set of abstract link information, connection of abstract links;
dividing, by the processor, the real network into a plurality of calculation domains, so that the real node belongs to any of the calculation domains;
specifying, by the processor, a calculation domain of a first hierarchical layer to which the real node of the real network has been added or deleted;
re-calculating, by the processor, a real path information of the calculation domain having been specified; and
re-generating, by the processor, the abstract link information of the abstract link,
wherein the abstract node is associated with a boundary node of the calculation domains, and the abstract link with which each of the real paths, with being added or deleted a link is associated, is defined in response to a change of a network topology of the real network, and link attribute of the abstract link is changed.

8. The method according to claim 7, wherein the calculation domains are configured in such a manner that a number of the boundary nodes between the calculation domains decreases.

\* \* \* \* \*